US012315326B2

(12) United States Patent
Harris et al.

(10) Patent No.: US 12,315,326 B2
(45) Date of Patent: May 27, 2025

(54) REWARDS SYSTEM USING SKILL/AMUSEMENT GAME PLAY DEVICE TO AWARD PRIZES

(71) Applicant: Aries Technology LLC, Las Vegas, NV (US)

(72) Inventors: Ronnie W. Harris, Las Vegas, NV (US); Kent Reisdorph, Las Vegas, NV (US); Janae Hoover, Las Vegas, NV (US); Rochelle Terman, Las Vegas, NV (US)

(73) Assignee: Aries Technology LLC, Las Vegas, NV (US)

(*) Notice: Subject to any disclaimer, the term of this patent is extended or adjusted under 35 U.S.C. 154(b) by 0 days.

(21) Appl. No.: 17/549,641

(22) Filed: Dec. 13, 2021

(65) Prior Publication Data

US 2022/0172568 A1 Jun. 2, 2022

Related U.S. Application Data

(63) Continuation of application No. 15/929,892, filed on May 28, 2020, now Pat. No. 11,200,781.

(Continued)

(51) Int. Cl.

| | |
|---|---|
| ***G07F 17/32*** | (2006.01) |
| ***G07F 17/42*** | (2006.01) |
| *G07F 17/34* | (2006.01) |

(52) U.S. Cl.

CPC ...... *G07F 17/3211* (2013.01); *G07F 17/3209* (2013.01); *G07F 17/3213* (2013.01);

(Continued)

(58) Field of Classification Search

CPC .. A63F 13/30; A63F 13/45; A63F 9/30; G07F 17/3297; G07F 17/3202

See application file for complete search history.

(56) References Cited

U.S. PATENT DOCUMENTS

| | | | |
|---|---|---|---|
| 5,342,049 A | 8/1994 | Wichinsky et al. | |
| 5,397,134 A * | 3/1995 | Fishman | G07F 17/32 221/210 |

(Continued)

OTHER PUBLICATIONS

Pro Display, Transparent OLED Screen, https://prodisplay.com/products/transparent-oled-screen/, accessed Sep. 21, 2020, 7 pages.

(Continued)

*Primary Examiner* — Dmitry Suhol
*Assistant Examiner* — Jason Pinheiro
(74) *Attorney, Agent, or Firm* — Snell & Wilmer LLP

(57) ABSTRACT

A "dual" gaming unit or machine is configured to implement both one or more traditional casino-style wagering games, such as games having outcomes determined primarily by chance and not skill, and one or more games which are traditionally not casino style games, such as amusement-type games or games having amusement-type game components, such as games where the outcome is determined substantially by skill. The wagering game portion of the gaming machine may award monetary awards to the player for winning wagering game outcomes, and the amusement portion of the gaming machine may be used to award promotional prizes to the player. A player rewards system may include such dual gaming units or other award dispensing mechanisms.

17 Claims, 15 Drawing Sheets

Related U.S. Application Data

(60) Provisional application No. 62/948,578, filed on Dec. 16, 2019, provisional application No. 62/888,920, filed on Aug. 19, 2019.

(52) U.S. Cl.
CPC ...... *G07F 17/3225* (2013.01); *G07F 17/3239* (2013.01); *G07F 17/3253* (2013.01); *G07F 17/3255* (2013.01); *G07F 17/3262* (2013.01); *G07F 17/3267* (2013.01); *G07F 17/42* (2013.01); *G07F 17/3297* (2013.01); *G07F 17/34* (2013.01)

(56) References Cited

U.S. PATENT DOCUMENTS 5,816,918 A * 10/1998 Kelly .................. G07F 17/3248 463/16
5,855,374 A 1/1999 Shoemaker, Jr.
6,152,447 A * 11/2000 Stanley ..................... A63F 9/30 273/448
6,588,760 B2 7/2003 Carter, Jr. et al.
6,598,881 B1 7/2003 Shoemaker, Jr.
6,899,337 B2 5/2005 Fisher et al.
7,066,811 B1 * 6/2006 Defrees-Parrott ........................... G07F 17/3262 463/19
8,079,596 B1 * 12/2011 Shoemaker, Jr. ... G07F 17/3297 273/447
8,371,944 B2 2/2013 Kelly et al.
8,550,901 B2 10/2013 Walker et al.
9,186,574 B2 * 11/2015 Riggles ..................... A63F 9/30
10,307,665 B2 * 6/2019 Chu .......................... A63F 9/30
10,565,830 B1 * 2/2020 Georgilas ............ G07F 17/3297
10,839,651 B2 * 11/2020 Smart ................. G07F 17/3213
11,107,325 B2 8/2021 Harris et al.
11,200,781 B2 12/2021 Harris et al.
11,328,562 B2 * 5/2022 Smart ................. G07F 17/3209
11,443,596 B2 * 9/2022 Palchetti ............. G07F 17/3295
11,568,704 B2 1/2023 Harris
11,727,765 B2 8/2023 Narita et al.
2001/0024970 A1 9/2001 McKee
2003/0119576 A1 * 6/2003 McClintic ............... G07F 17/32 463/20
2004/0018865 A1 * 1/2004 Gilmore .............. G07F 17/3211 463/7
2004/0048659 A1 * 3/2004 Seelig ................. G07F 17/3295 463/25
2005/0119041 A1 * 6/2005 Berman .................. G07F 17/32 463/16
2005/0202866 A1 * 9/2005 Luciano ............... G06Q 10/087 463/20
2007/0087834 A1 4/2007 Moser et al.
2008/0032785 A1 * 2/2008 Crowder ................. G07F 17/32 463/25
2008/0227538 A1 9/2008 Kelly et al.
2009/0191931 A1 * 7/2009 Peck ................... G07F 17/3202 463/7
2009/0247276 A1 7/2009 Okada
2010/0144419 A1 6/2010 Miltenberger et al.
2010/0203948 A1 8/2010 Falciglia, Sr.
2011/0086687 A1 4/2011 Guarnieri
2011/0115163 A1 5/2011 Guarnieri et al.
2013/0127482 A1 5/2013 Chang et al.
2013/0130781 A1 5/2013 Anderson et al.
2013/0217482 A1 8/2013 Kelly
2013/0231166 A1 9/2013 Riggles
2015/0072748 A1 3/2015 Lyons
2016/0210712 A1 7/2016 Jamieson
2016/0300442 A1 10/2016 Preisach
2017/0169666 A1 6/2017 Mayeroff
2017/0270743 A1 9/2017 Guerrero
2017/0330418 A1 11/2017 Link et al.
2018/0158275 A1 6/2018 Manz et al.
2018/0253931 A1 9/2018 Maddox
2019/0206195 A1 * 7/2019 Kido .................. G07F 17/3213
2020/0111280 A1 4/2020 Cleveland et al.
2020/0302740 A1 9/2020 Cleveland et al.
2020/0302746 A1 9/2020 Cleveland et al.
2021/0056803 A1 2/2021 Harris

OTHER PUBLICATIONS

Adrenaline, BO-46-1000—Blackout Prize Operation & Service Manual, obtained Dec. 2019, 18 pages.
Blackout, Adrenaline Amusements, www.aagames.com, circa 2013, 1 page.
Haw, "The relationship between reinforcement and gaming machine choice", 2008, retrieved on [Mar. 12, 2020]. Retrieved from the internet <URL: https://ap-st01.ext.exlibrisgroup.com/61SCU_INST/upload/1607040046658_The%20relationship%20between%20reinforcement%20and%20gaming%20machine%20choice.pdf> entire document, 11 pages.
International Search Report and Written Opinion for application No. PCT/US2020/046802, mailed Jan. 13, 2021, 22 pages.
USPTO, Office Action for U.S. Appl. No. 15/929,889, mailed Mar. 24, 2021, 13 pages.
USPTO, Office Action for U.S. Appl. No. 15/929,891, mailed Apr. 1, 2021, 7 pages.
USPTO, Office Action for U.S. Appl. No. 15/929,892, mailed Apr. 5, 2021, 18 pages.
USPTO, Office Action for U.S. Appl. No. 15/929,893, mailed Apr. 12, 2021, 6 pages.
USPTO, Notice of Allowance for U.S. Appl. No. 15/929,891, mailed May 24, 2021, 9 pages.
USPTO, Notice of Allowance for U.S. Appl. No. 15/929,889, mailed Aug. 13, 2021, 8 pages.
USPTO, Notice of Allowance for U.S. Appl. No. 15/929,892, mailed Sep. 21, 2021, 15 pages.
USPTO, Office Action for U.S. Appl. No. 15/929,893, mailed Oct. 12, 2021, 14 pages.
USPTO, Notice of Allowance for U.S. Appl. No. 15/929,893, mailed Apr. 14, 2022, 5 pages.
USPTO, Office Action for U.S. Appl. No. 17/461,168, mailed Oct. 5, 2022, 27 pages.
USPTO, Notice of Allowance for U.S. Appl. No. 17/461,168, mailed Feb. 16, 2023, 9 pages.

* cited by examiner

REWARDS SYSTEM USING SKILL/AMUSEMENT GAME PLAY DEVICE TO AWARD PRIZES

RELATED APPLICATION DATA

This application is a continuation of U.S. application Ser. No. 15/929,892, filed May 28, 2020, which claims priority to U.S. Provisional Application Ser. No. 62/948,578, filed Dec. 16, 2019, and U.S. Provisional Application Ser. No. 62/888,920, filed Aug. 19, 2019 Each of said prior applications are incorporated herein by reference in its entirety.

FIELD OF THE INVENTION

The present invention relates to gaming devices or machines.

BACKGROUND OF THE INVENTION

The wagering game industry (casinos, related gaming establishments and the manufacturers of casino-style games) continues to strive to make their gaming machines attractive to players. One dynamic is that younger people have grown up playing video amusement games (such as arcade-style games or such games presented via a home gaming console) where they are actively involved in the game and the outcome thereof. These younger players have shown less interest in playing standard slot and video poker gaming machines than older generations of players.

As a result, the wagering gaming industry has experienced a push to move from chance-based gaming to skill-based gaming. Thus far, this approach has had limited success. Several companies have created skill-based video-style wagering games. These games play more like a mobile, PC, or video arcade game than a traditional slot game. The reasons for the limited success of these games are many and varied, but the fact is this approach has not been successful.

A gaming device which addresses these and other problems is desired.

SUMMARY OF THE INVENTION

One aspect of the invention is a "dual" gaming unit or machine which is configured to implement both one or more traditional casino-style wagering games (casino-style games where the outcomes of the games are determined primarily by chance and not skill) and one or more games which are traditionally not casino style games, such as amusement-type games or games having amusement-type game components, such as games where the outcome is determined substantially by skill.

In one embodiment, the "dual" gaming unit or machine may comprise a housing, an amusement-type game device comprising a prize area for containing one or more prizes for winning as a result of the play of the amusement-type game device, at least one player input device for receiving input from a player to control the amusement-type game device, at least one display device visible through the prize area, a monetary-value receiving device for creating a monetary value credit balance at the gaming machine, a processor configured to execute machine-readable code stored in memory to present at least one wagering game to the player in response to a wager placed from the monetary value credit balance, comprising presenting wagering game information on at least one of the display devices, determining an outcome of the wagering game and awarding winnings for winning outcomes of the wagering game, and activating the amusement-type game device for play by the player one or more times.

Additional aspects of the invention comprise a gaming system which includes one or more prize or promotional servers and one or more gaming machines of the invention, wherein at one or more times the promotional server may award a player who is engaged in the play of wagering games at the gaming machine the opportunity to play the amusement game, such as for an additional prize.

Another aspect of the invention is a rewards system for awarding a prize to a player of a gaming machine which is configured to present at least one wagering game, wherein the prize is awarded separate from any winnings awarded by the gaming machine for a winning wagering game outcome. The rewards system may comprise a prize rewards server and an automated prize redemption unit having a housing which defines a prize storage area, a controller, a media reader and a prize dispenser which is controlled by the controller and configured to deliver a prize from the prize storage area to a dispensing area, wherein the rewards server is configured to compare activity information obtained from the gaming machine to criteria associated with one or more stored prize events and when criteria for one of the prize events has been met, to command the gaming machine to issue a media from a media dispenser of the gaming machine to the player and store information regarding the media and an awarded prize, and when the media is read by the media reader of the prize redemption unit and information regarding the media is received from the prize redemption unit, compare the information regarding the media received from the prize redemption unit against the stored information to determine if the media is valid, and if so, cause the controller of said prize redemption.

Yet another embodiment of the invention comprises a casino player tracking system configured to reward awards to a player, comprising a plurality of gaming machines configured to present wager-based games to a player having a player tracking account, a player tracking server configured to track game play by the player at the plurality of gaming machines and, at one or more times, award a free amusement style game play to the player and associate the award with the player's player tracking account, an amusement-type prize-play device comprising a housing defining a prize area for containing one or more prizes for winning as a result of the play of the amusement-type game device, a moveable prize play mechanism, a controller, at least one player input device for receiving input from a player to control movable prize play mechanism, and a media reader, the controller configured to read a presented player tracking card and communicate with the player tracking server to obtain information regarding the award and permit the player to play the amusement-type prize-play device, wherein if the outcome of the play is a winning outcome, the controller is configured to award a prize to the player.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods of playing and presenting games, including one or both of wagering and amusement-style games, gaming machines configured to present wagering games, amusement-style games or both, gaming systems and prize redemption centers.

In accordance with one embodiment of the invention, a gaming machine is a "dual" gaming unit or machine which has and implements both one or more traditional casino-style wagering games (casino-style games where the outcomes of the games are determined primarily by chance and not skill; referred to herein generally as the "casino game(s)") and one or more non-casino type games. The non-casino type games may comprise games which are traditionally not casino-type games, such as games or events which are traditionally amusement-type games or skill games, or games having amusement-type game components, such as games where the outcome is determined substantially by skill (referred to herein generally as an "amusement" or "amusement-style" event or game).

The gaming machine of the invention may be located at a casino or other location. As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers, game servers, reward or promotional servers or the like.

Figure 1A:
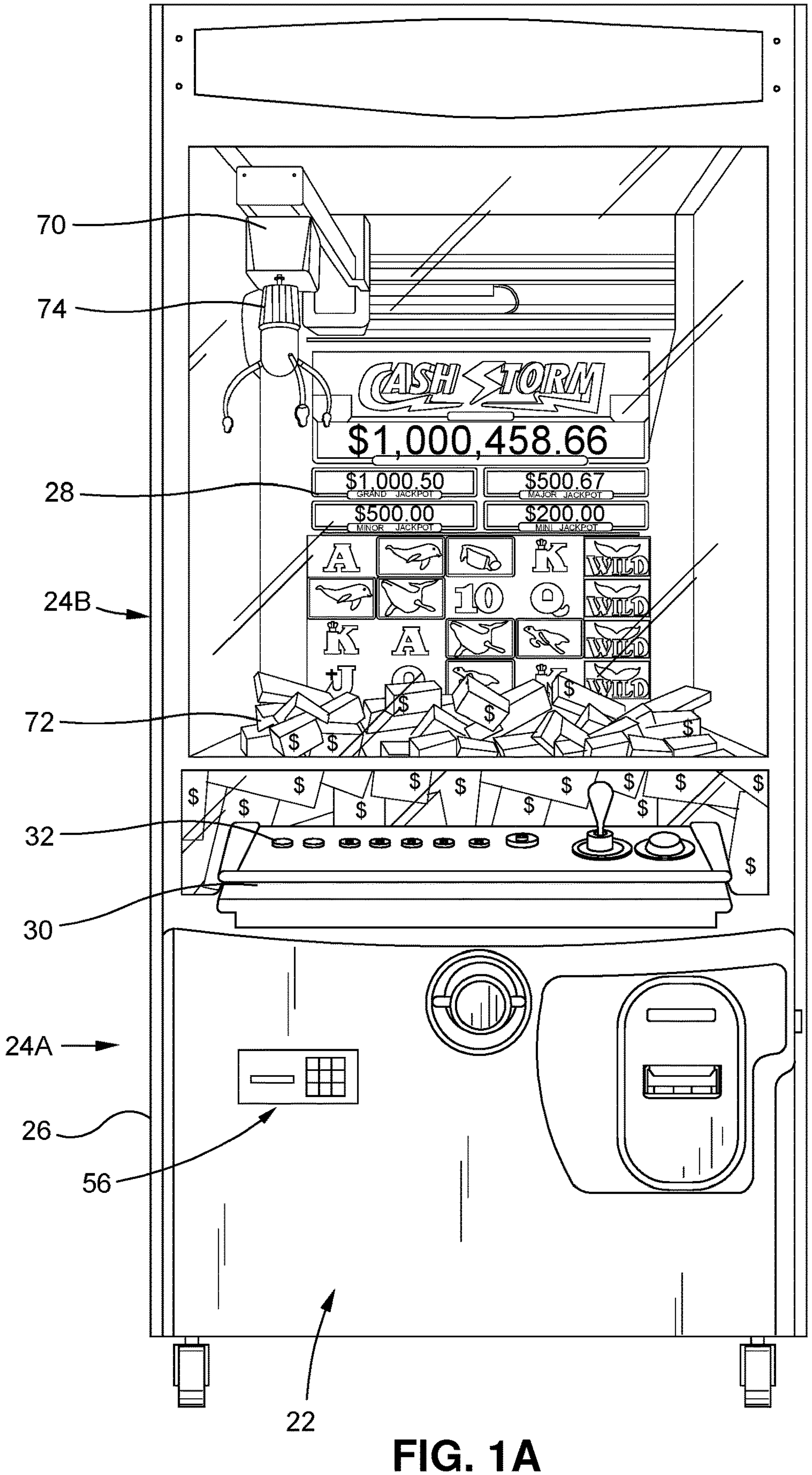
FIGS. 1A and 1B illustrate embodiments of a gaming machine of the invention.
Figure 1B:
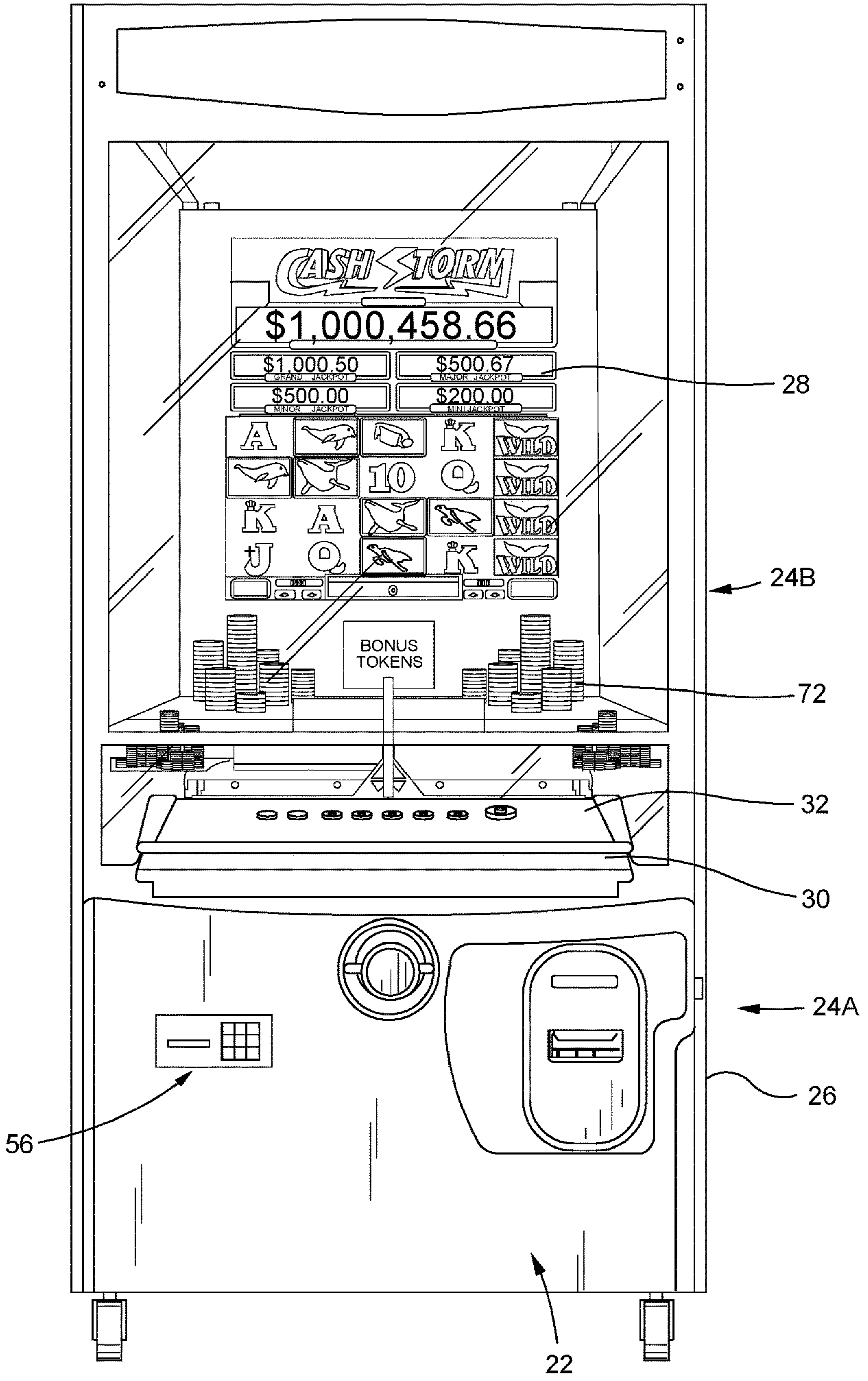

Two configurations of a gaming machine 22 of the invention are illustrated in FIGS. 1A and 1B. As illustrated, the gaming machine 22 generally comprises a housing or cabinet 26 for supporting and/or enclosing various components required for operation of the gaming machine. In the embodiment illustrated, the housing 26 is generally "box" shaped, having a front (which the player faces) and an opposing back, a right side and a left side (when facing the front), and a top and a bottom. However, the housing 26 could have other configurations, as noted below.

The housing 26 may have one or more enclosed or generally secure areas. For example, the housing 26 may include a first lower secure area 24A for housing one or more first components of the gaming machine 22, such as a processor, bill validator (and associated ticket or cash box), and other features. The housing may also include a second upper secure area 24B, such as for housing portions of an amusement game unit of the gaming machine 22, as described in more detail below (which may thus be referred to as the "amusement game area").

As noted, in a preferred embodiment, the gaming machine 22 is a dual unit that has one or more features or components for presenting a casino-style wagering game and one or more features or components for presenting an amusement-type game.

In general, in order to present casino-style wagering games, the gaming machine 22 includes one or more features for accepting monies or monetary value or otherwise allowing a user to wager monies or monetary value, and features which cause the gaming machine 22 to present a wagering game to a player, such as by displaying wagering game information. Certain wagering game outcomes (but preferably not all game outcomes) may be designated as winning outcomes (the non-winning outcomes may be referred to as losing outcomes), wherein prizes or awards may be provided for winning outcomes, such as monetary payments (or representations thereof, such as prize of credits). As such, the gaming machine 22 preferably includes a mechanism or means for returning unused monetary funds and/or dispensing winnings to a player, as described in more detail below.

Figure 1C:
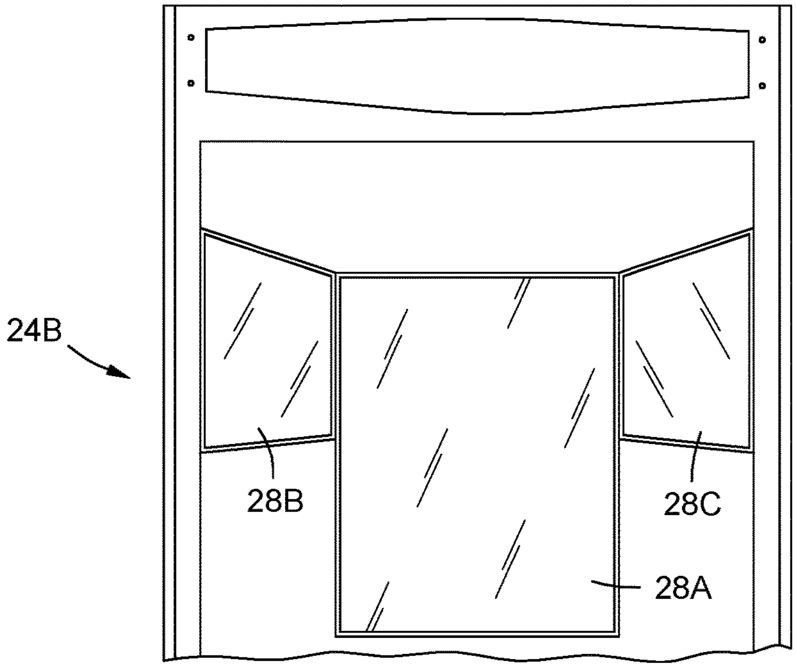
FIGS. 1C, 1D and 1E illustrate variations of configurations of video displays of the gaming machines illustrated in FIGS. 1A and 1B.
Figure 1D:
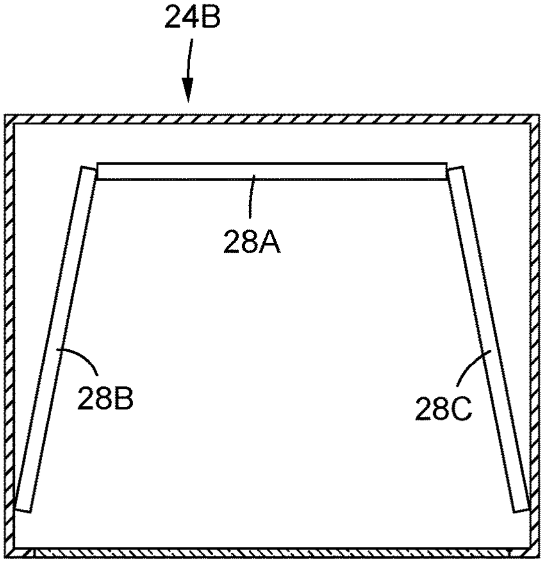
Figure 1E:
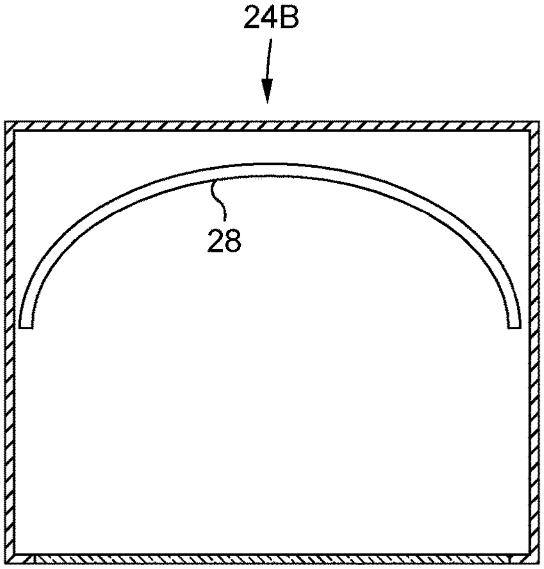

In order to present or display wagering game information to a player, the gaming machine 22 includes at least one display device 28. The display device 28 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display device 28 may be capable of projecting or displaying a wide variety of information, including images, symbols and other indicia or information associated with game play, game promotion or other events. As illustrated in FIGS. 1A and 1B, the display device 28 might comprise a single flat panel display. As illustrated in FIG. 1E, the display device 28 might have other configurations, such as being a curved display (in this case, curved about its vertical axis).

The gaming machine 22 might include more than one display device. For example, as illustrated in FIGS. 1C and 1D, the gaming machine 22 might include a main or first display device 28A and one or more additional displays, such as a second display device 28B and a third display device 28C. In the illustrated embodiment, the second and third display devices 28B, 28C are located on either side of the main display device 28A and positioned at angles thereto. However, the displays could be oriented in various manners.

In one embodiment, as described in more detail below, the one or more display devices 28 may be located at the back of the second area 24B of the gaming machine 22. In other embodiments, as described in more detail below, the display devices 28 might comprise a portion of panels or sides of the gaming machine 22 or such portions and one or more displays inside the gaming machine 22 as illustrated in FIGS. 1A and 1B.

While the display device may comprise one or more video displays, in another embodiment, the gaming machine 22 may include one or more physical reels capable of displaying game information, such as slot symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depressing a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference.

Figure 1F:
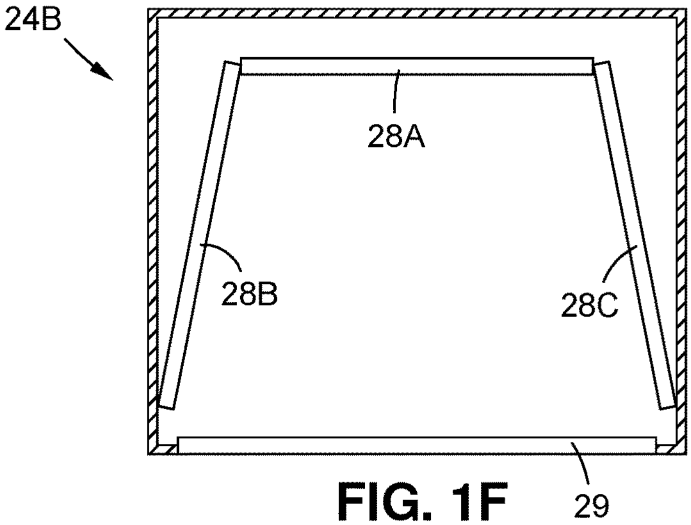
FIG. 1F illustrates a variation of the gaming machines illustrated in FIGS. 1A and 1B as including a touch screen.

The gaming machine 22 preferably includes one or more player input devices 32 to enable a player to play a wagering game (such as input buttons, plunger mechanisms, a touch-screen display, joystick, touch-pad or the like). These one or more input devices 32 may be utilized by the player to facilitate wagering game play, such as by providing input or instruction to the gaming machine 22. For example, such input devices 32 may be utilized by a player to place a wager, cause the gaming machine 22 to initiate a game, to initiate a reel spin, to "cash out" of the gaming machine, or to provide various other inputs, such as to buy a game card, and/or daub a card and claim winnings, such as in a game of bingo. In one embodiment, a touch-screen may be associated with the second area 24B of the gaming machine 22. For example, as illustrated in FIG. 1F, a touch-screen 29 might be associated with a front glass or other transparent panel or display of the second or upper area 24B, whereby the player could provide input by touching the enclosure of the second area 24B in front of them. Of course, in other embodiments, the deck 30 might incorporate one or more displays having a touch screen or otherwise include a touch screen.

Figure 2:
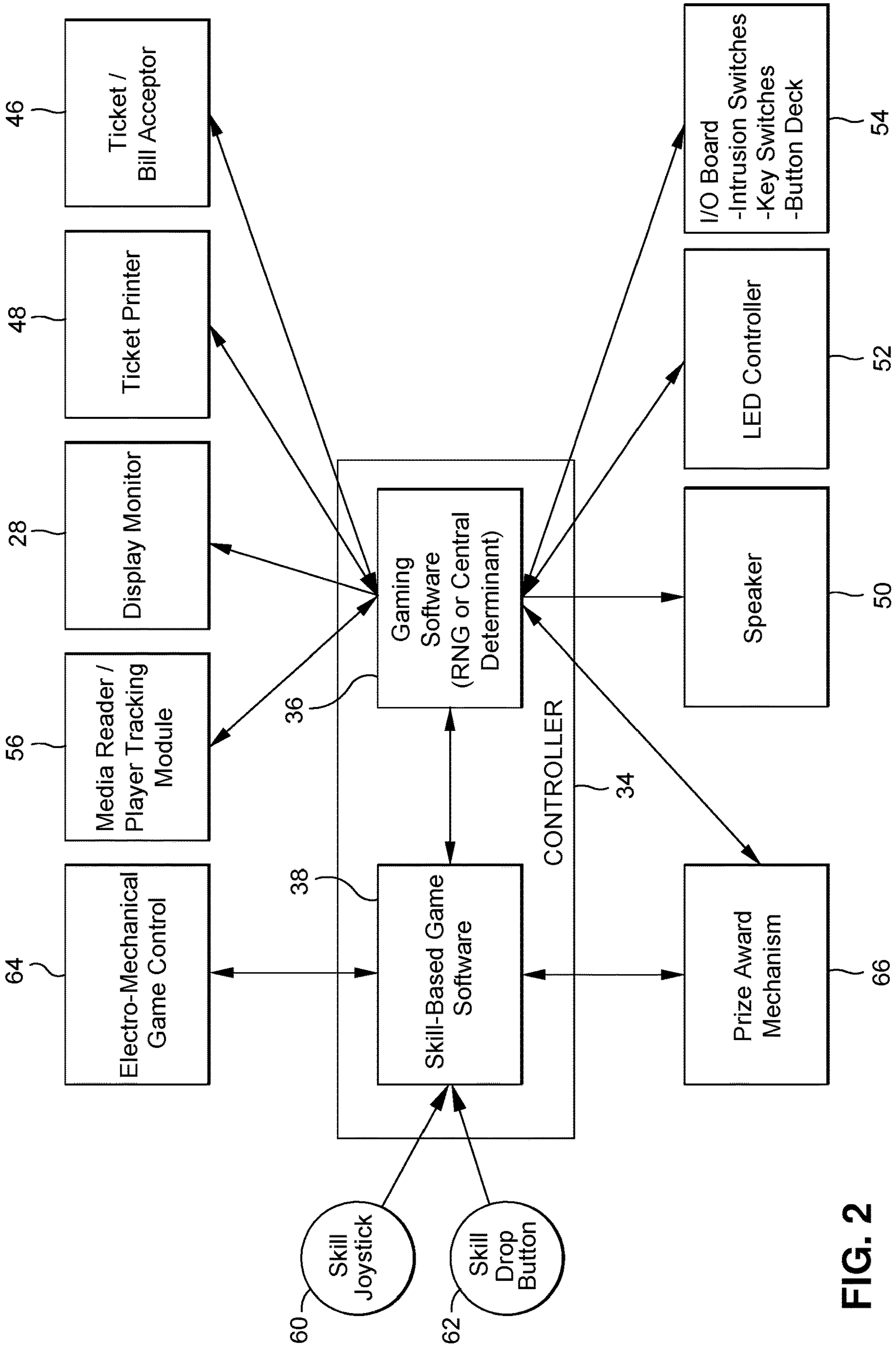
FIG. 2 is a block diagram of a configuration of features of a gaming machine of the invention.

Referring to FIG. 2, in one preferred embodiment, the gaming machine 22 includes at least one microprocessor or controller 34 for controlling the gaming machine, including receiving player input and sending output signals for controlling the various components of the gaming machine 22, such as peripheral devices of the machine (such as generating game information for display by the display device 28). The controller 34 may be arranged to receive information regarding funds provided by a player to the gaming machine 22 and to thus create or increase a credit balance, receive input such as a purchase/bet signal when a purchase/bet button is depressed (and correspondingly reduce the credit balance), and receive other inputs from a player. The controller may be arranged to generate information regarding a game, such as generating game information for display by at least one display device 28 (such as information comprising game information such as slot symbols, playing cards, bingo cards, bingo balls, etc., depending upon the game being presented), for determining winning or losing game outcomes and for displaying information regarding awards for winning game outcomes, among other things.

The controller 34 may be configured to execute machine readable code or "software" or otherwise process information, such as obtained from a remote server. A first set of game software 36 or other instructions may be stored in memory (such as a data storage device, not shown), e.g. in a fixed or non-transitory configuration, such as for use in implementing the wagering/casino-style game. The memory may also store other information or data, such as data stored in table or other forms (including, but not limited to look-up tables, pay tables and other information including tracked game play information). The gaming machine 22 may also include one or more random number generators for generating random numbers (such as implemented by a random number generator software module stored in the memory and executable by the processor 34), such as for use in presenting the game in a random fashion (e.g. whereby the game is presented in a manner in which the player cannot control the outcome) or pseudo-random fashion (e.g. such as where the game includes a skill component which can affect the outcome of the game). As indicated above, the machine readable code may be configured in various manners, such as by having various "modules" of software which are designed to implement specific features of the game play or game presentation. In one embodiment, as illustrated, the processor 34 may execute software that implements an operating system, such as Microsoft® Windows®, Linux, etc. The first set of game software 36 may then be executed relative to that operating environment.

The gaming machine 22 may be configured to generate and present games in a stand-alone manner or it may be in communication with one or more external devices or systems at one or more times. The gaming machine 22 might communicate with one or more of such external devices or systems via one or more communication ports or other interface devices. These ports or interface devices may be configured to implement various communication protocols (including proprietary protocols) and communicate via wireless, wired or other communication link. For example, the gaming machine 22 may be configured as a server based device and obtain game code or game outcome information from a remote game server (in which event the gaming machine controller may receive game information from the server, such as game outcome information, and use that server-generated information to present the game at the gaming machine). As one example, when the gaming machine 22 is configured to present a multi-player bingo game, the gaming machine 22 may communicate with one or more game servers to obtain information regarding a purchased bingo card, selected or drawn bingo balls, and to confirm game outcomes, such as interim pattern matches or game-ending pattern matches of the drawn bingo balls to the game indicia associated with a bingo card assigned to the player.

As indicated, the gaming machine 22 is configured to present one or more wagering games. The gaming machines 22 is preferably configured to accept value, such as in the form of coins, tokens, paper currency or other elements or devices representing value such as monetary funds. Thus, as indicated above, the gaming machine 22 preferably includes a mechanism or means for accepting monetary value. For example, the gaming machine 22 might include a coin acceptor for accepting coins. Of course, associated coin reading/verifying devices and coin storage devices may be associated with the gaming machine 22 if it is configured to accept coins. Likewise, as illustrated in FIG. 2, the gaming machine 22 might include a media reader 46. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOBs, magnetic stripe cards or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications), such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits, such as to purchase one or more games or game cards (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiments, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 22 to indicate their desire to cash out, such as by selecting a "cash out" button or touch screen feature or providing other input. In response, a monetary value represented by the player's credit balance or the like is preferably paid, transferred or otherwise provided to the player. For example, upon an award or at cash-out, associated funds may be paid to the player by the gaming machine 22 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In this regard, the gaming machine 22 may include one or more media printers or writers 48. In other embodiments, the cash-out mechanism may result in the funds value being transferred to an external device or account, such as a player's casino account (such as associated with a casino server), a remote bank or other financial account, or an electronic device such as a player's phone, PDA or tablet.

The gaming machine 22 may also include a player tracking device, such as a card reader and/or an associated keypad or other input device (such as a touch screen display) 56. Such player tracking devices are well known and may permit the game operator to track play of players of the gaming machine. The tracked play may be utilized to offer player bonuses or awards.

As illustrated in FIG. 2, the primary controller or processor 34 may communicate with several of the peripheral devices via one or more intermediary controllers. For example, the processor 34 might communicate with one or more audio generating devices or speakers 50, either directly or through an audio card, to cause the one or more speakers to generate sound. Likewise, the processor 34 might communicate with one or more light generating devices, such as LEDs, to cause them to generate lighting or lighting effects at the gaming machine 22, such as via an LED controller 52. The processor 34 might communicate with other devices of the gaming machine 22, such as the player input devices 32, intrusion detection devices (not shown), switches or other elements of the machine, via a peripheral controller 54.

As indicated above, the gaming machine 22 is preferably a "dual" gaming unit which is also capable of presenting one or more amusement-style games or events. Thus, the gaming machine 22 includes elements or features for use in presenting such a game or event.

In one embodiment, one or more of the player input devices 32 are utilized to facilitate play of the amusement-style event. These input devices 32 may comprise one or more of the input devices which are used to present the casino-style wagering game, but may also comprise one or more different input devices. As described below, in two exemplary embodiments, the amusement-style events may comprise a crane event or a coin-pusher event. In the crane event, a player attempts to guide a crane or claw to a position and then use the crane or claw to grab an object, such as a prize. In the coin-pusher event, the player attempts to guide a coin onto a location of a coin platform such that a moving coin pusher pushes one or more coins off of the platform. In the case of the crane event, the player input devices 32 may thus comprise a crane control such as a joystick 60 and claw drop button 62 (see FIG. 2) which communicate player inputs thereto to the processor 34, which then generates corresponding control instructions for output to a crane controller 64 (which may control one or more motors or the like for changing the location of the crane, dropping a claw of the crane, closing a bucket or claw of the crane, etc.). In the case of the coin-pusher event, the player input device 32 might comprise a movable coin launcher which enables a player to direct a coin to a desired location by rolling the coin down a slot of a guiding device. Such a launcher may comprise a guide which is mechanically mounted to the gaming machine 22. Of course, the amusement-style event might comprise any number of other events now known or later developed, and might comprise pinball type events, Pachinko type events, skee-ball, shooting or target events, scoop crane type events, or others.

The gaming machine 22 further comprises one or more amusement-style event presentation elements. As illustrated in FIG. 1A, in one embodiment, the gaming machine 22 may be configured to present a crane amusement event. In this configuration, one or more crane elements are preferably located in the second or upper area 24B of the gaming machine 22. As illustrated, the second area 24B is preferably generally enclosed to define an interior area. Moreover, the second or upper area 24B may be at least partially enclosed by one or more transparent panels so that the interior of the area is visible to the player. Inside of the second area 24B may be located a crane 70 and one or more prizes 72. The crane 70 may comprise a claw 74, and is located above the prizes 72, which may be located at a bottom of the second area 24B. Play or presentation of the crane event is described in more detail below. Prizes might be located in the prize area in various ways, including by being piled or stacked on a base of the second area 24B, or by being located on a stand or rotating platform in the second area 24B.

In another embodiment, as illustrated in FIG. 1B, the gaming machine 22 may be configured to present a coin-pusher amusement event. In this configuration, one or more coin pusher elements are preferably located in the second area 24B of the gaming machine 22. Inside of the second area 24B may be located a platform having an edge or drop off, one or more coins on the platform, and a moving pusher device which may move towards and away from the edge of the platform, whereby if a sufficient number of coins are located between the pusher and the edge of the platform, when the pusher is moved towards the edge of the platform, one or more coins fall off the edge.

As illustrated in FIG. 2, the gaming machine 22 may again comprise software for use in implementing the amusement-style event. For example, the gaming machine 22 may include a second set of software 38, such as amusement event software, which may be stored in the one or more memory devices and be executed by the processor 34, such as within the operating environment. As illustrated, the amusement game and wagering game software may communicate. Further, the processor 34 may execute the amusement event software 38 for use in controlling aspects of the amusement portions of the gaming machine 22, such as the crane control 60, a prize award mechanism 66 or the like. In one embodiment, the amusement event player input devices, such as the crane joystick 60 and drop button 62, may be controlled by/linked to the first set of game software 36, but in other embodiments, it could be controlled by or linked to the amusement game software 38. In some embodiments, the crane or claw might include a light beam emitter for emitting a beam downwardly into the prize area and/or a camera (such as to provide an overhead view of the claw relative to the prize area), and such elements may be controlled by the processor 34.

In a preferred embodiment, the gaming machine 22 has a front and one or more of the player input devices 32 are located at the front, such as at a console or deck 30. As indicated, the second area 24B is preferably wholly or partially enclosed by one or more substantially transparent panels. This allows players and third parties to see into the second area 24B, such as from the sides and front.

Most advantageously, the display device 28 is preferably located at the back of the second area 24B. In this manner, the player views the display device 28 through the second area 24B. Thus, a player of the gaming machine 22 is fully aware of both the wagering game experience as presented by the display device 28, but also the fact that the gaming machine 22 has an amusement aspect, including the potential to win prizes (which are preferably visible to the player in the second area 24B) by play of the amusement aspect. Further, as described below, the same display device 28 may be used to display information which is related to the amusement aspect.

Figure 3:
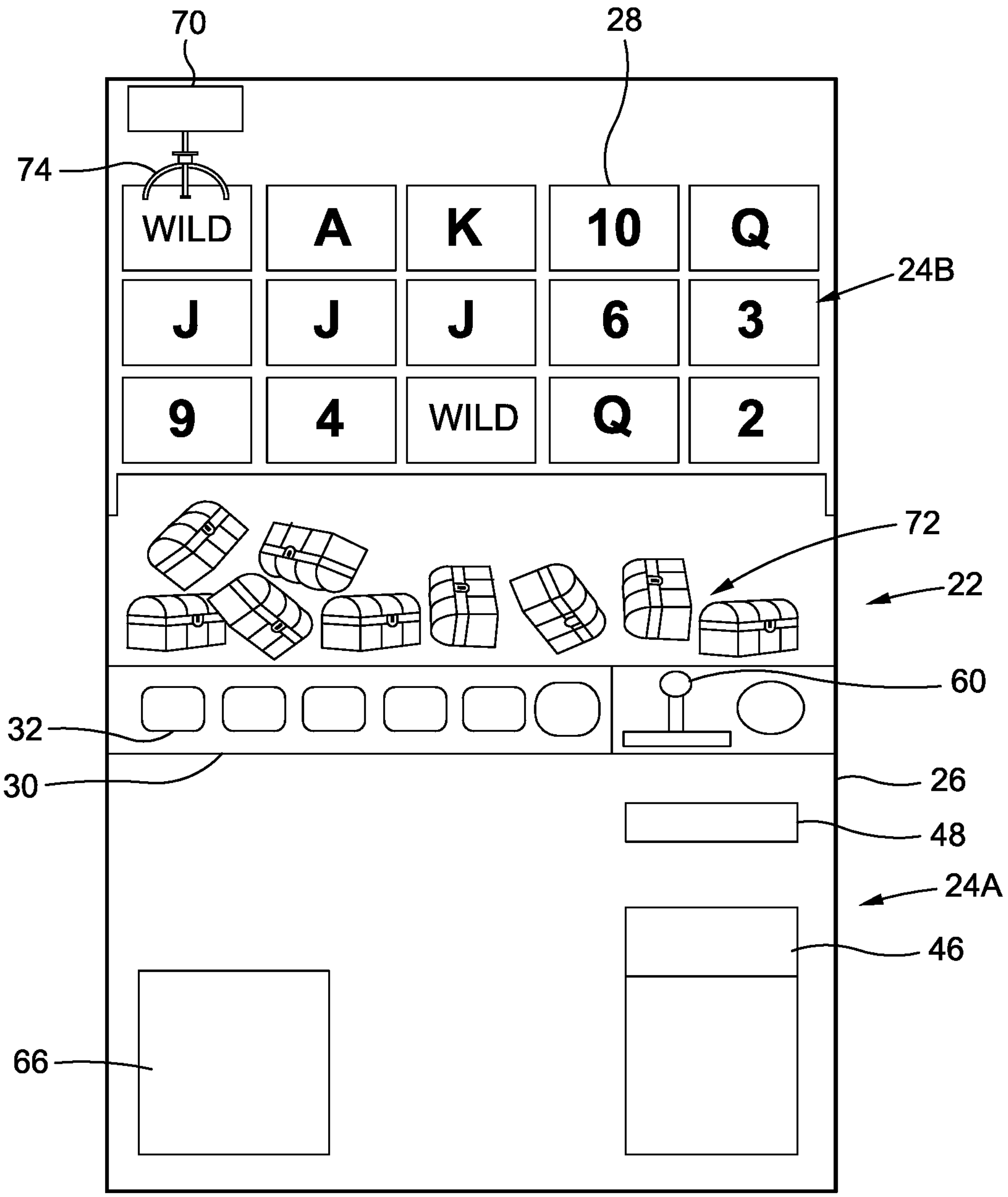
FIGS. 3 and 4 illustrate aspects of embodiments of a gaming machine of the invention.

Additional aspects of the invention will be described with reference to FIGS. 3 and 4, which illustrate a variation of the gaming machine 22 of the invention which includes a crane-type amusement event. Referring to FIG. 3, a player may associate monies or monetary value with the gaming machine 22 so as to have one or more monetary value credits to wager. The player may then place a wager of those credits to play one or more wagering games. At this time, the amusement-type event is not active. The processor of the gaming machine 22 causes the gaming machine 22 to present a wagering game. Such a game might comprise what are known as “Class III” games, such as slot-type games, video poker or other card games or the like. As described in more detail below, however, such a game might comprise a “Class II” game, such as a game of bingo, pull-tabs or the like.

In either event, game information is displayed to the player via the display device 28 which is visible by the player through the second area 24B. As illustrated in FIG. 3, such information might comprise the display of one or more slot game symbols.

The outcome of the wagering game is determined (where the outcome depends upon the type of game being presented). If the outcome of the wagering game is losing, the player loses their wager (although as noted below, the player might then be awarded one or more plays of the amusement-type game). If the outcome of the wagering game is winning, the player may be awarded an award, such as one or more credits which are added to the credit meter or one or more plays of the amusement-type game. The player might cash-out these credits for monetary value, such as in the form of a ticket which can be redeemed for monies at a cashier station.

Figure 4:
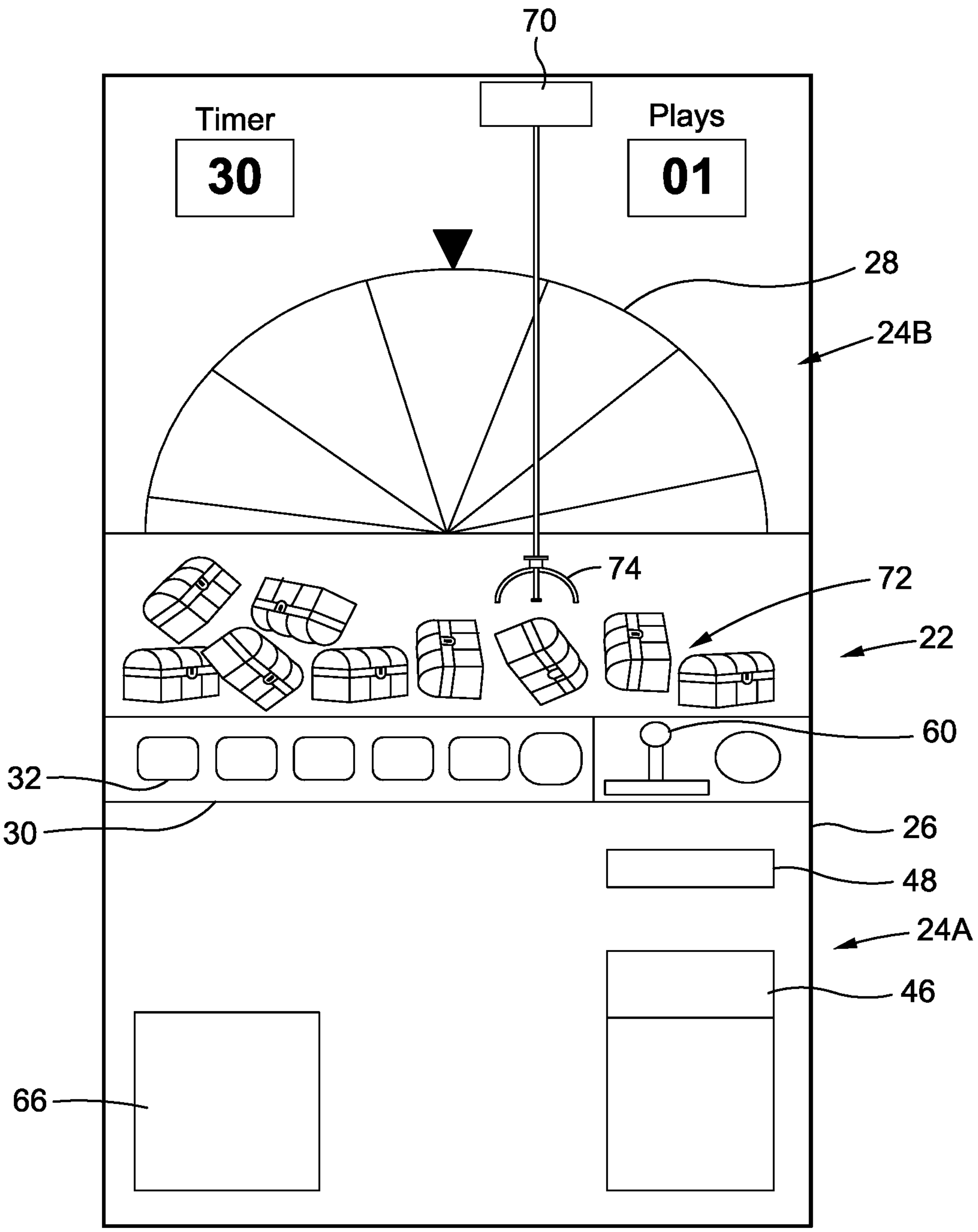

As illustrated in FIG. 4, at one or more times, the amusement-type event may be activated. At this time, information relating to the amusement-type event might be displayed by the display device 28. For example, as illustrated in FIG. 4, the display device 28 might display information such as a count-down timer showing an amount of time a player has to move the crane claw into position, a number of remaining crane plays, and a bonus prize wheel. When the amusement-type event is activated, the player may have a designated period of time within which to provide input to the joystick to move the crane to a desired position in the second area over the prizes there beneath, and to then lower the claw in an attempt to grab a prize. If successful, the claw grabs a prize and raises it up and the crane may automatically move to a drop position to award the prize to the player (for example, by dropping the prize into a prize hopper for access by a player or by evaluating the prize and awarding it in the form of a ticket or the like, as further described below).

It will be appreciated that the gaming machine illustrated in FIGS. 1A and 1B are only exemplary of embodiments of a gaming machine of the invention. For example, it is possible for the gaming machine to have various other configurations, including different shapes and styles and having different components than as just described.

As indicated herein, one or more portions of the housing 26 of the gaming machine 22, such as portions of the upper housing 24B, may be transparent so as to allow the player to see through the portions to an interior area of the gaming machine 22. In one embodiment, however, the portions need not be transparent all of the time. For example, various portions of the housing 26 might comprise Smart Glass, polymer-dispersed liquid crystal (PDLC) film or other types of materials which are transparent at one or more times and may be opaque at other times. As one example, the sides (including the front) of the upper housing 24B might be rendered opaque (such as by the controller of the gaming machine sending a signal to a Smart Glass controller which controls Smart Glass panels) when the gaming machine is presenting a wagering game However, the sides of the upper housing 24B might be rendered transparent when it is desirable for the player to see through the sides, such as when a skill or amusement game is being presented. The sides of the upper housing 24B might also be rendered opaque when information is projected onto the sides in order to make that information more visible.

In another embodiment, one or more portions of the gaming machine 22 may be configured as displays (aside from the display 28). For example, one or more portions of the upper portion 24B may be configured as displays. As one example, the sides and/or front of the upper portion 24B may be configured as transparent monitors or displays. These transparent monitors can display information to a player but also allow the player to see through them, such as into the interior of the upper portion or area 24B. As indicated above, a touch screen might be associated with such displays so that information can be displayed to the player and the player may touch areas corresponding to display information to provide input (such as for play of the gaming machine 22, including either or both a wagering game and a skill/amusement game).

In one embodiment, portions of the gaming machine 22 may be used to display advertising. For example, advertising may be displayed onto the side panels of the upper portion 24B of the housing 26. This advertising may be "paid for" advertising which contributes to the profitability of the gaming device 22. In one embodiment, the advertising may be for products which can be won by the player as a reward. For example, a player might have the opportunity to win goods via play of the skill/amusement aspect of the gaming machine 22. The advertising might be for such goods.

Figure 1G:
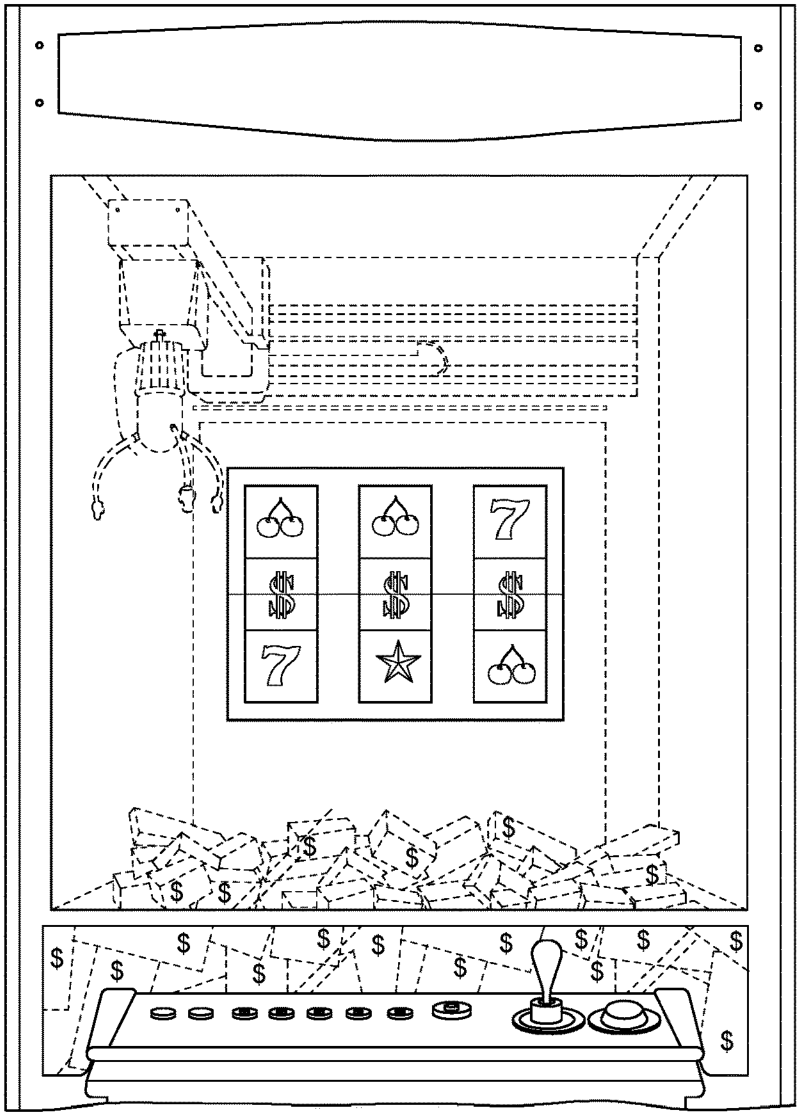
FIG. 1G illustrates a variation of the gaming machine illustrated in FIG. 1A as including a front panel configured as a game display.

For example, FIG. 1G illustrates a configuration in which the front side or panel of the upper housing 24B is rendered at least partially opaque in association with the display of wagering game information at that panel, whereby the interior features are partially or wholly no longer visible but the wagering game information is visible (in this case, in the form of displayed slot reels). In this configuration, the front panel may be partially opaque and display game information via the technology described above, and/or via projection or display of information at the front side or panel.

As one example, the gaming machines 22 do not need to have four sides. As one example, the housing 26, or at least the upper area 24B, might be cylindrical in shape or have other shapes. In such a configuration, the upper area 24B might utilize one or more cylindrical or curved displays or projection surfaces.

As indicated herein, in one embodiment, play of wagering games at the gaming machine 22 is enabled or initiated by a player placing a wager. Play of the amusement-style event may be initiated in various manners, but preferably not for payment. In other embodiments, however, the player might be permitted to play the amusement-style event based solely upon making a payment to play that event.

In one embodiment, the amusement-style event is utilized to award promotional prizes, e.g. prizes that are separate from the awards for the wagering games being played (e.g. do not change the paytable for the game or are not part of the paytable for the game).

As one example, one or more of the gaming machines 22 may be linked to a rewards or promotional system. In one embodiment, the rewards system may be used to award players of the gaming machine 22 with plays of the amusement-type events, thus offering the player chances for additional prizes.

In one embodiment, operators may create events in the rewards system. These events are scheduled and become active when start date and time of the event is met. The events define criteria for how a play of an amusement-type event is awarded, such as randomly, based upon activity at the wagering game or of wagering games played at other machines, or based upon factors or events external thereto. The events may be evaluated or determined at a player level (e.g. with regard to a "gaming session" played by a player), or based upon game play or other activities at a single gaming machine (which may comprise play at the machine by multiple players), or based upon game play or other activities at multiple gaming machines, such as at a bank or group of gaming machines or across an entire casino floor. Examples include, but are not limited to the following examples.

TABLE 1

| | |
|---|---|
| Unqualified<br>Prizes are awarded to players randomly. | Session Loss<br>An amount lost by a player during their session of game play. |
| Session Coin In<br>An amount wagered by a player during their session of game play. | Session Theoretical Loss<br>An amount of theoretical loss by a player during their session of game play. |
| Single Win<br>A specified amount that a player wins in a single game instance. | Games Played<br>The number of games played during a session of game play. |
| Session Win<br>An amount won by a player during their session of game play. | Games Played Without A Win<br>The number of games played during a session of game play without a win. |
| Continuous Play<br>An amount of play during a period of time and could be multiple players and multiple gaming machines. | Scheduled<br>Awarding a specified inventory during specific dates and times. |

In some embodiments, the play data might comprise particular wagering game events. For example, a player might win a free play of the amusement style game based upon obtaining a certain game symbol or outcome associated with the play of multiple wagering games. For example, a wagering game might comprise a slot game which can display a $ symbol. If the player receives the $ symbol in a plurality of separate plays of the wagering game, the player may "collect" those symbols and once the minimum threshold is met, be awarded one or more free plays of the amusement type game.

As players play wagering games at the gaming machines 22, the rewards system collects play data. That play data is sent to the rewards system where it is compared against the parameters for events currently running. Once a threshold is met, one or more players (depending on the criteria) are awarded one or more plays of the amusement-type event at the gaming machine 22.

Figure 5:
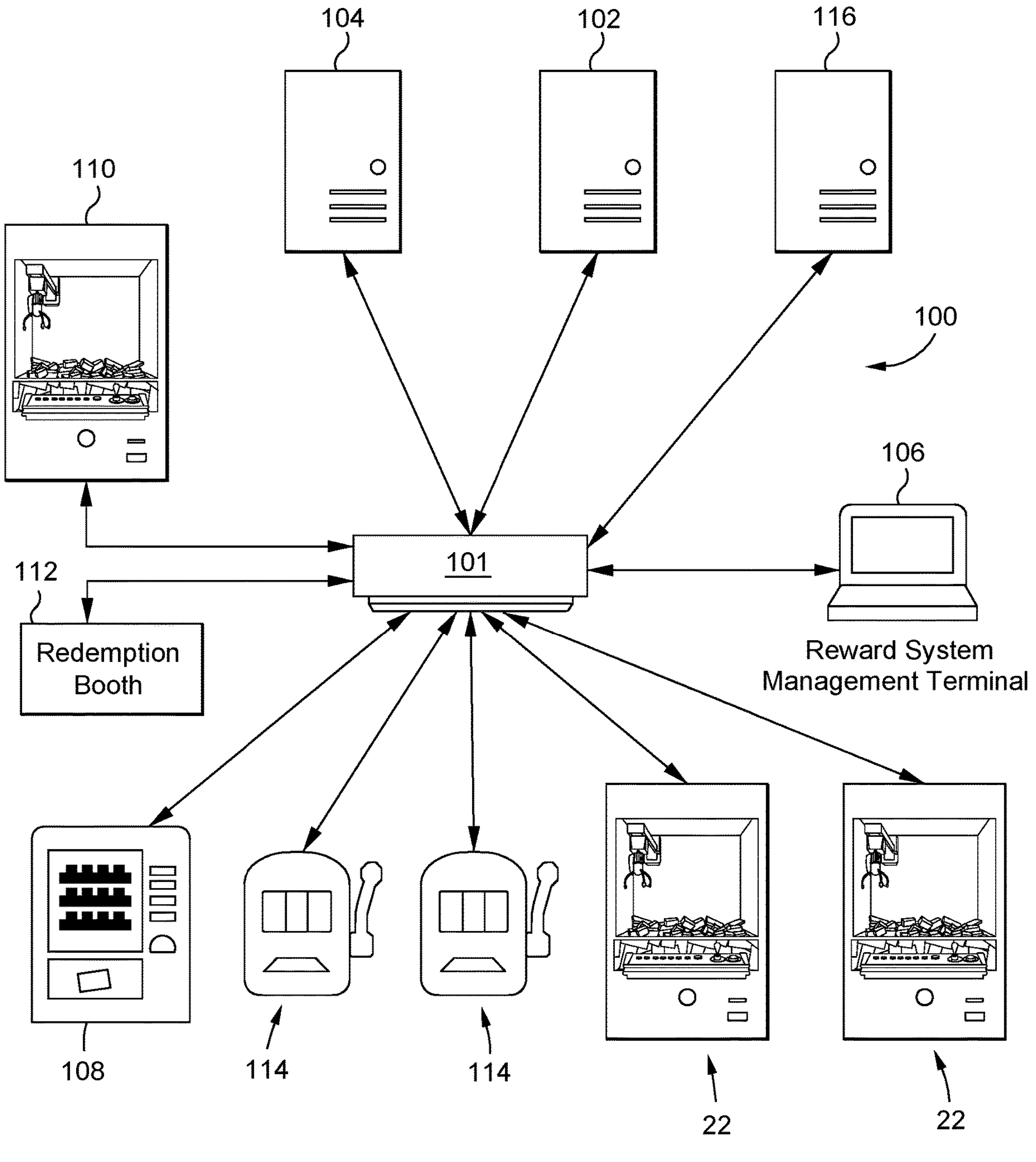
FIG. 5 illustrates one embodiment of a gaming system in accordance with the present invention.

One embodiment of the rewards system 100 topology is illustrated in FIG. 5. As illustrated various components or sub-systems may communicate with one another, such as via one or more networks or other communication links 101. In this configuration, the gaming machines 22 are configured to present wagering games comprising Class II games such as bingo games, and are thus connected to a central gaming system which may include one or more game servers 104 (e.g. a gaming system such as a Class II bingo or pull-tab system). The gaming machines 22 may also be connected to one or more other casino systems, such as a player tracking system 116 (such as a player tracking server), accounting system, etc.

In accordance with the invention, the gaming machines 22 are also connected to a rewards system. The rewards system may comprise a rewards server 102 and one or more rewards clients (not shown). The rewards clients may be associated with each gaming machine 22 and comprise a communication interface between the gaming machine 22 and the rewards server 102. The rewards clients may comprise, for example, interfaces to the gaming machines 22 for collecting or reporting information from the gaming machines 22 to the rewards server 102.

The rewards system might also comprise one or more management terminals 106, one or more automated prize redemption units or centers 108, a redemption booth 112 and one or more amusement/skill prize units 110. As detailed below, the rewards system might also connect to one or more electronic player interfaces (EPIs) 114. As described below, such EPIs 114 might comprise gaming devices or machines which are configured to present one or more wagering games, but which might not be configured as a "dual" unit as described above wherein the unit is also configured to present one or more skill/amusement games as described.

The rewards server 102 may comprise a computing device that comprises a processor, memory for storing machine readable code that is executable by the processor (e.g. software), and a communication interface. The management terminal 106 may comprise a computer device or may be an interface terminal, and may include a display, a user input device, a processor, memory, software, etc. The software which the processors of the rewards servers 102 and terminals 106 may be configured to cause them to implement the functionality described herein.

In relation to the "dual" gaming machines 22 as described herein, one embodiment of a promotional award flow is as follows:

Casino sets up an event in the rewards system (such as by input to the management terminal 106 which serves as an interface to the rewards server 102, wherein event data may be created, such as via the use of an event configurator having a graphical user interface, wherein created event information is stored in one or more memory devices, such as in a database associated with the rewards server 102).

Patron plays a wagering game at one of the gaming machines 22.

Rewards client (at the gaming machine) collects play data and sends it to rewards server 102.

Rewards server 102 monitors play data until a threshold matching the event is met.

Rewards server 102 sends a message to the rewards client to cause the gaming machine 22 to award one or more plays of the amusement-type event at the gaming machine 22.

In one embodiment, the player of a wagering game may be notified that they are entitled to play the amusement game and the amusement game may be enabled at the end of the play of a wagering game or when designated by the player.

The outcome of the amusement-type event may comprise a winning outcome (such as where the player successfully grabs a prize with the crane claw and collects that prize from the gaming machine 22, such as via a prize hopper), or might be a losing outcome (no prize is successfully grabbed or won). In some instances, players may be awarded additional amusement-type event plays. For example, the rewards server might determine that a prize should be awarded and so it transmits a signal to the gaming machines 22 that the players thereof are entitled to play the amusement-type events at those machines. The players of those gaming machines might all unsuccessfully operate the claws or cranes thereof or otherwise not win any prizes. As a result, the rewards server might continue to signal the gaming machines 22 to award additional amusement-type event plays until one of the players of the gaming machines 22 successfully wins a prize.

It will be appreciated that different types of prizes might be awarded by the amusement-type devices. For example, the prizes might comprise coins, currency, tangible goods, or items which are redeemable for monies, goods or services. As one example as further described below, the prizes might comprise eggs, boxes/chests or the like that contain a prize or that contain an RFID tag that identifies a prize. The player might take an egg that they successfully won to a prize redemption center to redeem it for the prize. As noted below, prizes might also include additional plays of the amusement-type game, or might comprise free plays of the wagering game.

As noted above, in a preferred embodiment, play of the amusement-type game is independent of the wagering game from the perspective of the paytable of the game, meaning that plays of the amusement-type game are not defined as elements of awards by the wagering game itself and the awards of prizes via the amusement-type game are not part of the "win" of the wagering game which is awarded out of player wagers. In this situation, the prizes which are awarded via the amusement-type game must be independently funded. They might be funded from general promotional funds by a casino. In another embodiment, the display device 28 might be utilized to display commercials or other information, either for payment which is used to purchase the prizes for the amusement-type game, or in exchange for contributions of prizes for the game.

In some instances, the outcome of the amusement-type event may be determined solely by the skill of the player. However, in other embodiments, the outcome of the event might be only partially determined by the skill of the player. For example, assume that the prizes inside of the second areas 24B of the gaming machines 22 include cash rolls having values of $1, $100, $1000 and $10,000. The rewards server might determine that a $1000 prize should be awarded. The rewards server may signal one or more of the gaming machines 22 to allow the play of the amusement-type event and that the $1000 may be awarded. A player of one of those gaming machines 22 might play the crane game and grab a $10,000 prize. In that event, the prize might be detected (such as via a detector associated with the device, such as a mass sensor associated with the claw/crane, a reader (such as to read an RFID tag associated with a prize, which tag identifies the prize), or the like) and the claw/crane may be instructed to drop the prize back into the prize area (e.g. to prevent the player from winning the prize, such as by moving it to a prize drop/dispensing area). In that event, the player might be given another play of the amusement-type event in order to provide them with the opportunity to grab and win the $1000 prize (or in other embodiments, the player might simply lose and not be awarded any prize). In this regard, while the amusement-type game preferably has a player skill component, aspects of the outcome need not solely be based upon the skill of the player. Various control instructions may be used to impact the play of the amusement-type game, including the outcome thereof. For example, relative to a crane type game, while the player might move the crane to a designated position and lower the claw, whether or not the claw grabs a prize may not only depend upon the player's skill in positioning the claw, but might include control over the "grip" level of the claw, control over opening and/or closing of the claw, etc. Such control may be based, in part, upon a table of desired outcomes or other instructions. For example, as noted above, how the claw is controlled might depend upon a desired frequency of prize awards, type of prizes to be awarded and the like, wherein such frequency and prizes may be impacted by player input.

In one embodiment, it might be desirable for the player to attempt to grab or obtain an object, without directly awarding the object (e.g. without directing the prize from the prize area to a dispensing area, such as through a chute to a bin where the player may grab the prize). This configuration has the benefit that prizes are not dispensed from the prize area to the player, which has the problem of requiring the prize area to be restocked or filled frequently. As one example, the objects which the player obtains (such as grabbing with a claw), may simply be a trigger for an award. As one example, the prize area might be filled with objects, such as eggs (or other objects such as boxes, etc.). When a player is successful in grabbing an egg, a random number generator may be used to award a prize based upon a pay table of prizes. The prize might be awarded from the device in the form of a ticket, etc. As one example, a pay table might define that Prize A is awarded for numbers 1-10, Prize B is awarded for numbers 11-50, and Prize C is awarded for numbers 51-100. When a player grabs an egg (such as detected by the claw grasping the egg, by an image sensor capturing information that the egg is in the claw, by a sensor detecting the egg has been dropped down a prize chute or the like), a random number generator (RNG) associated with the device (wherein the RNG may be implemented as software via the controller of the device) may be used to randomly generate or select a number between 1-100, wherein the selected number is then compared to the pay table to determine the awarded prize. The egg might then be dropped back to the prize area or might be dropped to a recycler—e.g. a location where the egg appears to be dispensed but is then eventually routed back to the prize area. In another embodiment, the object, such as an egg, may be coded, such as with a radio frequency identifier (RFID) chip. The chip may be read to determine the prize associated therewith. A ticket might then be dispensed to the player for the awarded prize. The player might then present the ticket to redeem the prize, such as at a gaming machine (such as when the ticket is for free game play or credits), a buffet or the like, or at a prize redemption booth or station. In such a configuration, the prize award mechanism 66 (see FIG. 2) might not comprise a prize hopper or other mechanism for dispensing a physical prize object to the player, but might comprise other devices for determining a prize or award.

Figure 10A:
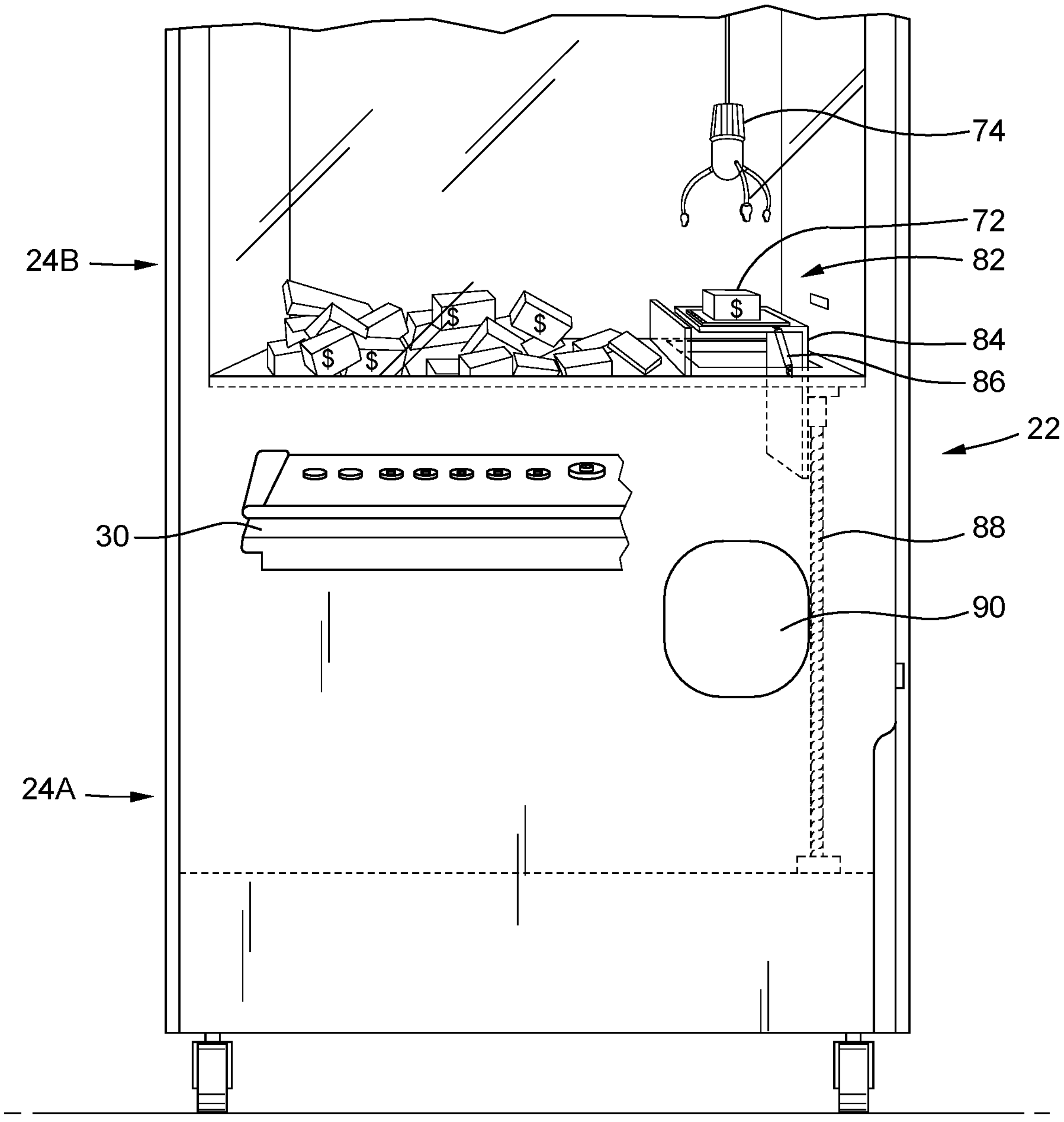
FIGS. 10A-C illustrate an embodiment of a prize delivery mechanism for a gaming device.
Figure 10B:
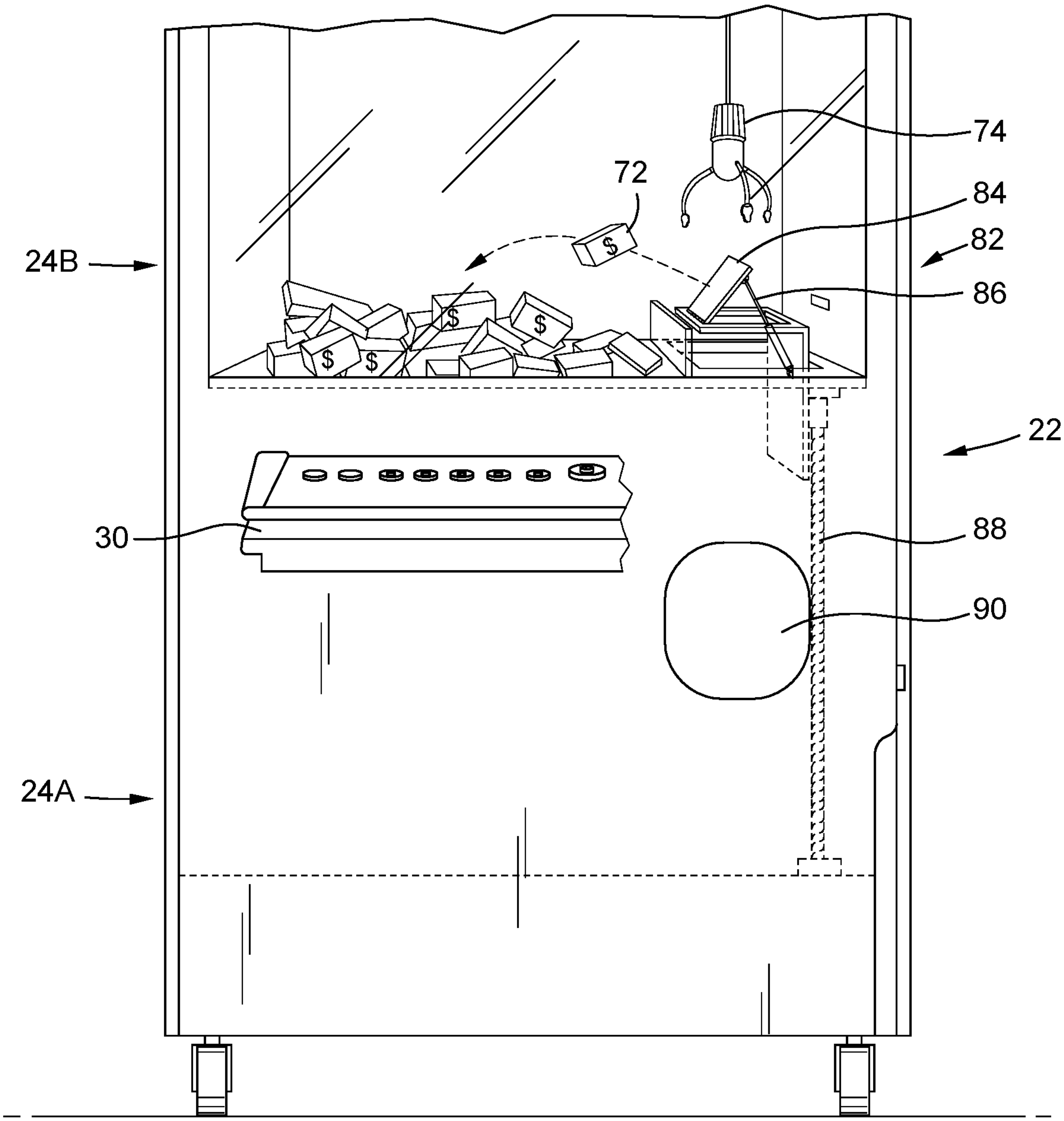
Figure 10C:
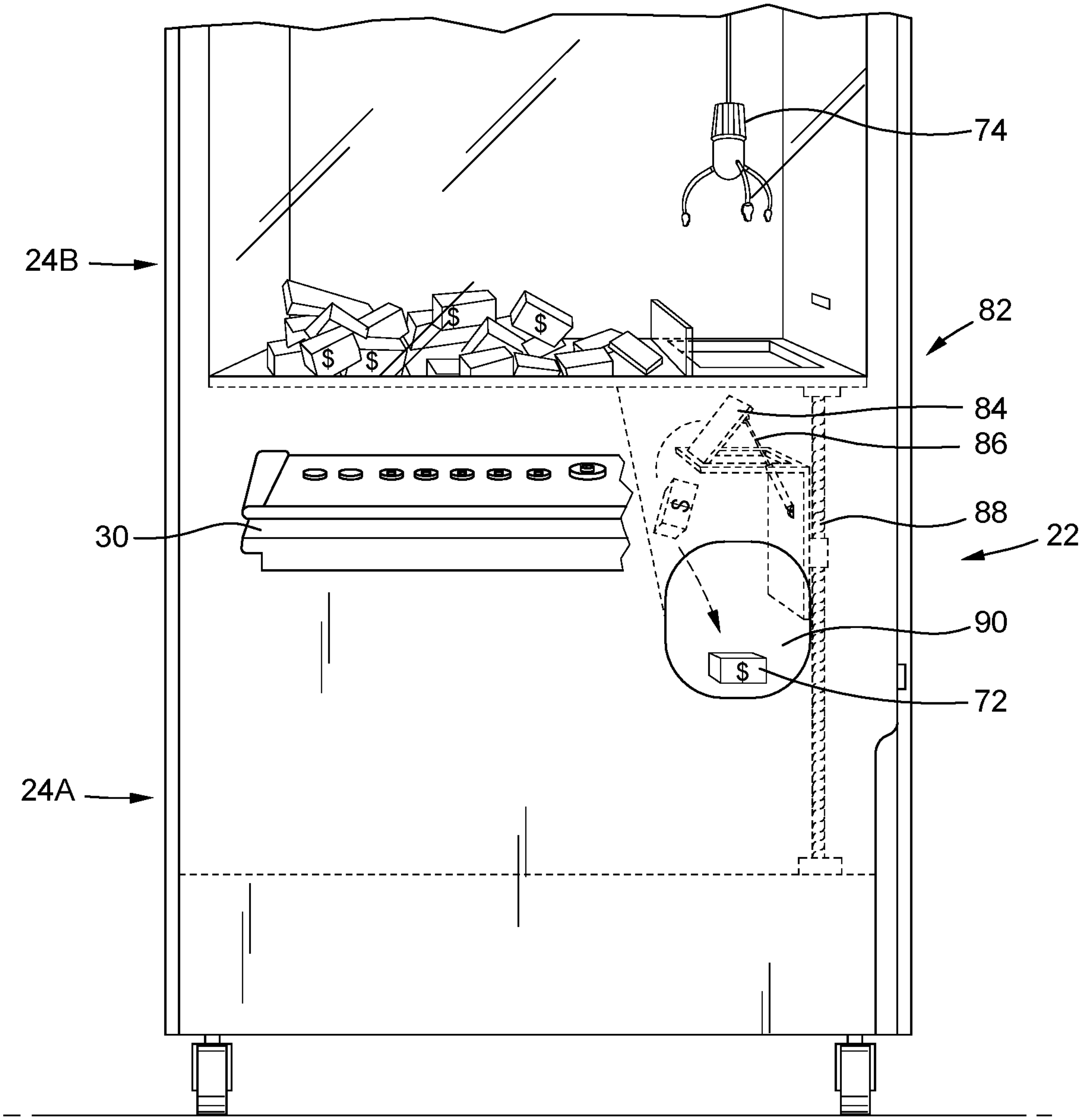

For example, FIGS. 10A-C illustrate an embodiment of a prize award or dispensing mechanism. FIG. 10A illustrates a gaming machine 22 that includes a prize award mechanism 82 which comprises a platform 84 and means for moving the platform. The means for moving may, for reasons indicated below, be configured to move the platform 84 between two or more elevated or vertical positions, and may further be configured to move the platform 84 between a prize "accepting" and prize "ejecting" position. In one embodiment, the means for moving the platform 84 may comprise, for example, an elevator 88 for changing a vertical position of the platform 84, and a tilting mechanism 86 for changing the position of the platform 84 between the prize accepting and ejecting positions. The elevator 88 might comprise a piston, screw drive, chain or belt drive, or other electro-mechanical device (e.g. where an electric motor powers the device) which can be controlled to move the platform 84 up and down (such as along a track, rail or slot). The tilting mechanism 86 might comprise a piston, articulating arm or other electro-mechanical device which is capable of moving the platform 84 from a generally horizontal position to a non-horizontal or "tilted" position, such as about a hinge or other rotating mount of the platform.

Additional aspects of the prize dispensing mechanism 82 will be appreciated from a description of its operation of use. As illustrated in FIG. 10A, the prize dispensing mechanism 82 may have a normal or base position where the platform 84 is at a first elevation and is in its prize accepting orientation (e.g., where the platform 84 is horizontal). If a player successfully grabs a prize 72, such as using the claw or crane 74, the prize may be placed on the platform 84. Preferably, in this position, the player can see the captured prize when the platform 84 is in this position (such as where the height of the platform 84 in its normal position places the platform, or at least the captured prize, in the view of the player in the second area 24B of the gaming machine 22).

The prize 72 is preferably evaluated by the gaming machine 22. Depending upon the outcome of the evaluation, the prize award mechanism 82 may enable one of three options. First, if the prize is of a first category, the prize might remain on the platform 84 while the platform is in its base position. The gaming machine 22 may signal (such as via the gaming system, lights associated with the machine, etc.) a gaming attendant to verify the prize. In one embodiment, as described herein, the gaming machine 22 may evaluate the prize in various manners, such as by reading an RFID tag associated with the prize via a reader. In one embodiment, if the prize is of a designated category, such as a high value, the prize may need to be confirmed by physical attendant and then be awarded by the attendant. As one example, once the attendant is called, the attendant may travel to the gaming machine 22 and verify the prize. This may comprise determining that the prize has been captured and placed on the platform 84 and/or by checking data at the gaming machine 22 confirming the prize (such as by interfacing with the gaming machine 22 to obtain game information, such as by logging into an operator interface of the gaming machine and having the gaming machine display information confirming the prize). Once the prize is verified, it may be awarded to the player. In a preferred embodiment, the prize is not physically awarded to the player by removing it from the gaming machine 22, but is instead awarded by the attendant, either in physical form or via a redeemable ticket, electronic award (such as to a player account) or the like. Thereafter, the prize is preferably returned to the prize area. In one embodiment, as illustrated in FIG. 10B, the platform 84 may be moved to its "prize ejecting" position, such as where the tilting mechanism 86 tilts the platform 84 towards the prize area, thus causing the prize 72 to be returned to the prize area (after which, the platform 84 might be moved back to its prize accepting position). In one embodiment, the platform 84 might be raised to a higher elevation or position in order to facilitate the prize return.

Second, if the prize is of a second category, the gaming machine 22 may issue an award and then return the prize or object to the prize area. For example, the gaming machine 22 may identify the prize (again, such as via RFID other various other means) and determine that it is not a prize which is to be directly awarded (as described below) or is not one that needs authorization to be awarded (as described above). In such an event, the gaming machine 22 might, as described herein, award the prize by dispensing a ticket which represents the award associated with the prize 72. Thereafter, the prize may be returned to the prize area as described above.

Third, if the prize is of a third category, the gaming machine 22 might directly award the prize 72 by dispensing it to the player. In this embodiment, as illustrated in FIG. 10C, the platform 84 might be moved to a second or lowered position (from the base position), such as via the elevator 88. The platform 84 might then be moved to its prize ejecting position, causing the prize to be directed to a prize retrieval location, such as behind a prize door 90. The player may then physically retrieve the prize.

In one embodiment, the means for moving may be controlled by a controller of the gaming machine 22, such as in conjunction with other functionality thereof.

Of course, the prize mechanism 82 might have various configurations for accepting a prize, returning a prize back to the prize area and for dispensing a prize to a retrieval area, including via other mechanisms than described herein. For example, other types of prize return or ejecting mechanisms might be used, such as sweeper arms or other mechanisms which physically contact the prize to move it back to the prize area. Also, the platform might be movable to other positions. In one embodiment, the platform might not need to move to a lowered position in order to dispense the prize. Instead, the platform might have a prize accepting position in which is generally horizontal, for accepting a prize. However, the platform might then tilt in a first direction to return the prize to the prize area and might tilt a second direction to direct the prize to a chute or the like for directing the prize to a retrieval area. In another embodiment, in order to allow the prize to be retrieved, the platform might be lowered all of the way down to a prize retrieval area, whereby the player can access the prize directly from the platform itself.

In some embodiments, the claw 74 could be configured to simply drop the prize back to the prize area if it is to be returned or drop it down a chute to a prize retrieval area if it is to be physically awarded. However, the player may then be confused about whether the prize has been successfully captured and awarded (particularly if the prize is dropped by the claw directly back to the prize area). The embodiment of the invention illustrated in FIGS. 10A-C has the particular advantage that the prize is placed on a "prize win" platform, clearly showing the player that the prize they grabbed with the crane 74 was successfully captured/won, and that the prize is being processed for award (and during the prize processing, information may be displayed to the player about the process, such as "MEGA PRIZE WIN—WAIT FOR ATTENDANT" or "PRIZE WIN!!—PLEASE TAKE AWARD TICKET" or "COLLECT PRIZE THROUGH PRIZE DOOR."

The prize award or dispensing mechanism may be implemented relative to a "dual" gaming machine 22 as described herein, but might be implemented relative to any type of gaming machine, including amusement-style or wagering-style gaming machine in which prizes or other objects are awardable.

As noted above, in one embodiment, play of the amusement-type game may comprise a promotional award, while in other scenarios, a player might directly purchase the play of the game. It will be appreciated that the control of the amusement-type device (apart from player input) may be based upon different instructions or criteria depending upon how the amusement-type game is awarded.

As noted above, in some embodiments, plays of the amusement-type game might result from play of a wagering game. For example, if a player receives a losing wagering game outcome, the rewards server might award the player a play of the amusement-type game. The play of the amusement-type game might be controlled to comprise a losing outcome, consistent with the losing outcome of the amusement-type game (but where the award of the play of the amusement-type game still enhances the anticipation and excitement of game play because the player still perceives an opportunity for a win), or the play of the amusement-type game might allow the player to actually win an award.

In another configuration, if a player wins the wagering game, they might be awarded winnings in the form of credits based upon a paytable of winning outcomes for the game, and the rewards server might also award the player one or more plays of the amusement-type game. Likewise, plays of the amusement-type game might result in plays of the wagering game. For example, in one embodiment, amusement-game prizes might be one or more "free games" which are redeemable or playable as wagering games. As one example, a player of the amusement-type game might pick up an egg or box which is associated with a prize one or more bingo cards which the player can play an EPI 114 or the wagering game portion of the gaming machine 22 of the invention, for a chance of wagering game winnings.

Other aspects of the invention, including other configurations of rewards systems, will now be described. In one embodiment, as illustrated in FIG. 5, a system of the invention may be configured to award rewards in various manners, other than via a "dual" gaming machine 22 as described herein, including via one or more automated prize redemption devices or centers 108, or via systems which include such devices or centers and one or more "dual" gaming machines 22.

Referring to FIG. 5, as patrons play gaming machines, such as a gaming machine 22 or an EPI 114 (wherein such an EPI 114 may have various configurations, such as by having some of the "casino wagering game" features of the "dual" gaming machine 22 noted above, but not having the secondary amusement/skill features thereof) at which the players may play games, and preferably wagering games (such as, but not limited to Class II games of bingo), the rewards system collects play data (as reported by or collected from the gaming machines). That play data is sent to the rewards system, such as to the rewards server 102, where it is compared against the parameters for rewards events. Once an event threshold or criteria is met, the player is awarded a reward or prize. Notification of the prize is displayed at the EPI 114. In addition, a ticket T may be dispensed to the player (such as by being printed by a ticket or media printer of the EPI), where that ticket is associated with or represents the prize. The prize might be a virtual game piece that counts towards a larger prize (as described below, where the player might be required to collect a number of game pieces in order to obtain the prize), it might be a free item the casino is giving away, or it might be a game piece in a secondary game or event such as a Monopoly® (a trademark of Hasbro) style game piece game, and so on. The prizes are determined by the facility running the rewards system.

Figure 6:
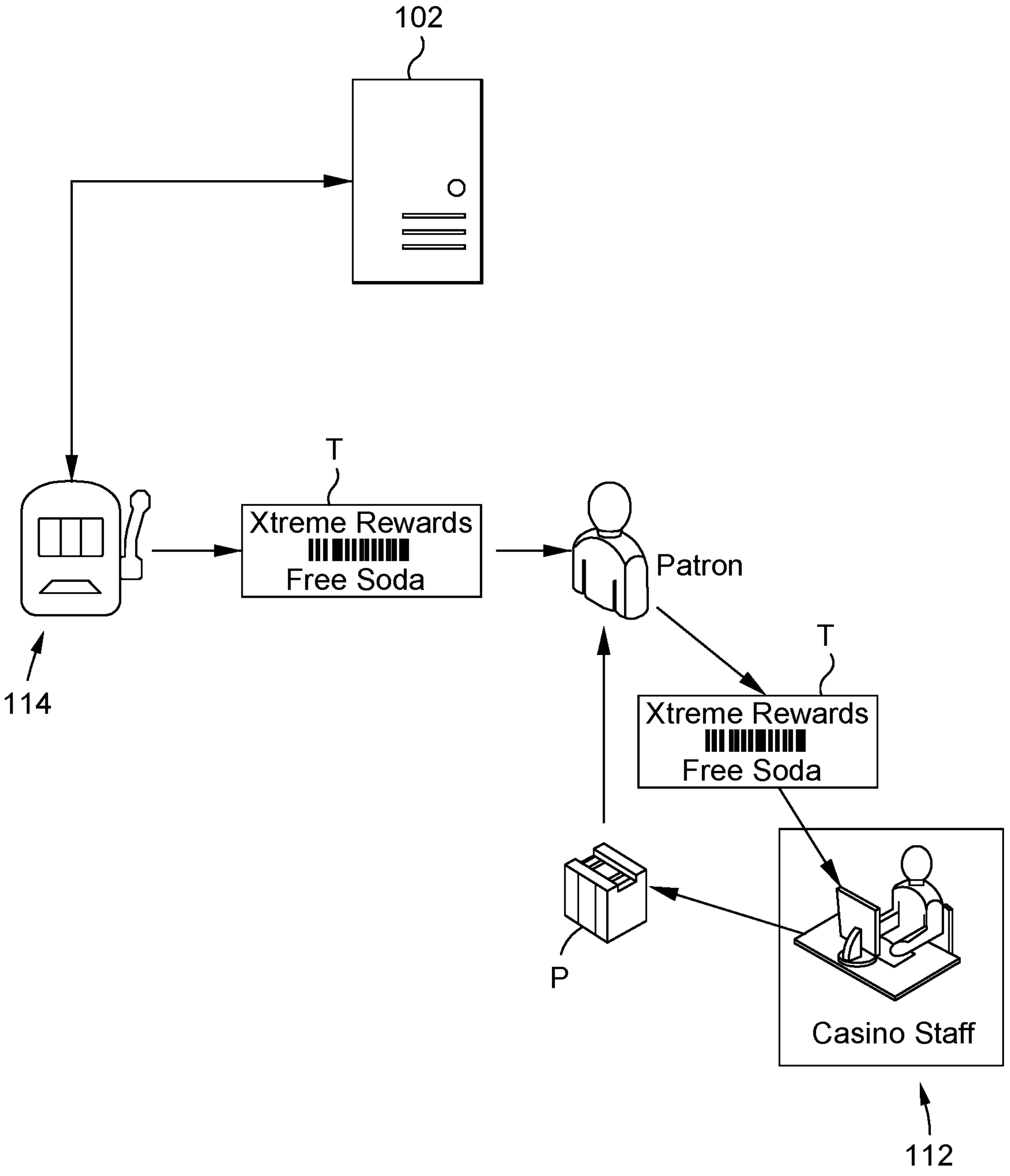
FIG. 6 illustrates one example prize award and redemption flow in accordance with an embodiment of the invention.

In one embodiment, prizes may be awarded or redeemed manually, such as illustrated in FIG. 6. One embodiment of the operation of the system in this configuration is as follows:

One or more rewards events are set up in the rewards system 100, such as in the manner described above.

Player plays a wagering game via one of the EPIs 114.

Rewards system collects play data and sends it to the rewards server 102.

Rewards server 102 monitors play data until a threshold matching the event is met.

Rewards server 102 sends a message to the rewards system awarding a prize.

Rewards system 100 displays prize award at EPI 114.

Optionally, the player can accept or reject prize.

If the player accepts, they receive a printed ticket T from the EPI.

Player takes the prize or rewards ticket T to casino staff (such as to a prize redemption booth 112) to redeem their prize (wherein the staff authenticates the ticket, such as by scanning it or entering information regarding it into a terminal for verification by the rewards server 102 and then provides the prize P or reward to the player).

Figure 7:
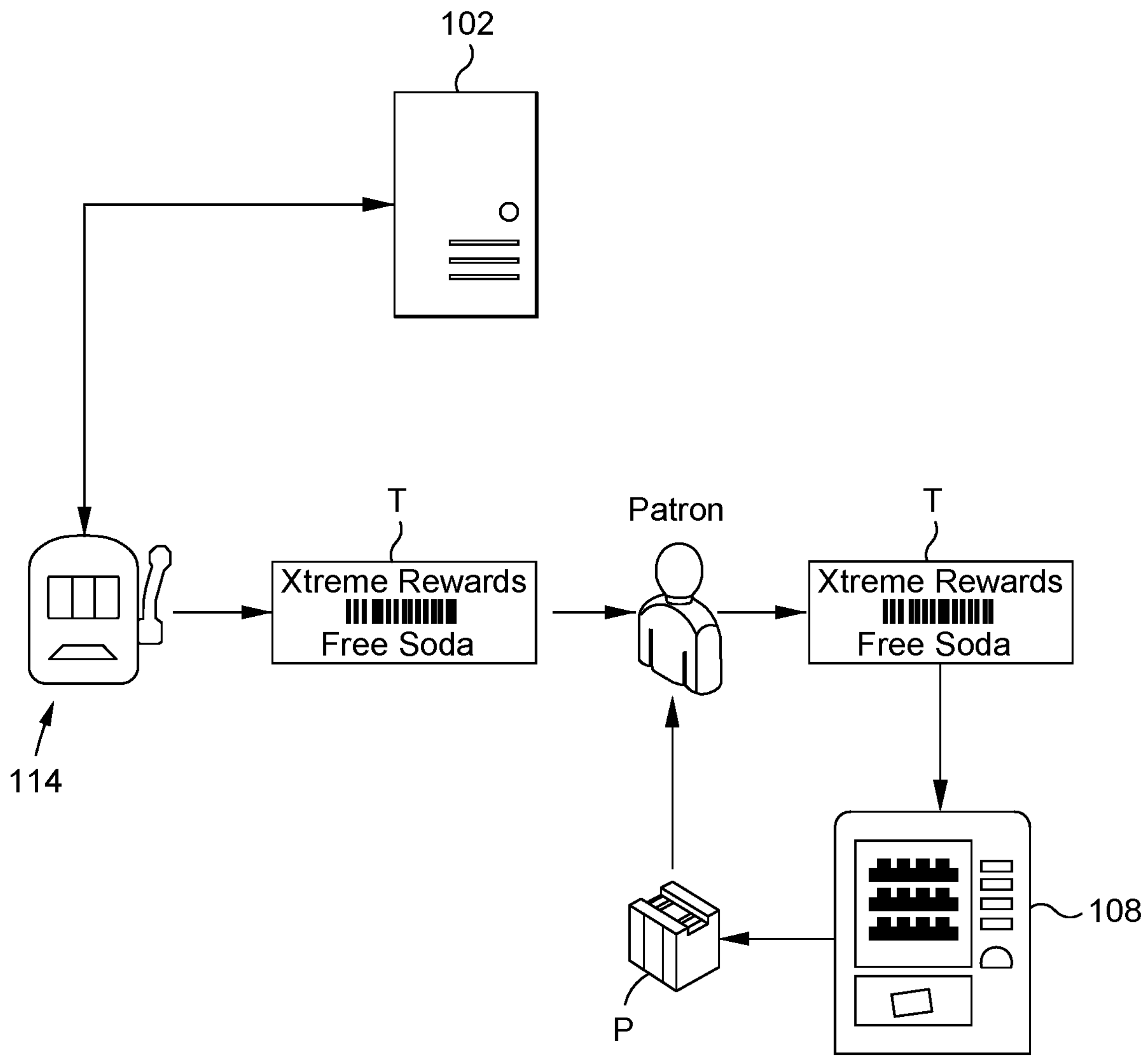
FIG. 7 illustrates another example prize award and redemption flow in accordance with an embodiment of the invention.

As described above relative to FIG. 5, the reward system 100 may include one or more automated prize redemption centers 108. As described below, such centers 108 may comprise automated prize redemption/award devices. Such centers may be used to automate the stocking of awards or prizes and the redemption thereof. Referring to FIG. 7, one embodiment of the operation of the system in this configuration is as follows:

One or more rewards events are set up in the rewards system 100.

Player plays a wagering game via one of the EPIs 114.

Rewards system collects play data and sends it to the rewards server 102.

The rewards server 102 monitors play data until a threshold matching the event is met.

The rewards server 102 sends a message to the system awarding a prize.

The system 100 displays the prize award at the EPI.

Optionally, the player can accept or reject prize.

If the player accepts, they receive a printed ticket T from the EPI.

The player takes the ticket T to the redemption center 108 to redeem their prize P (wherein the ticket is read at the redemption center and verified, such as by the redemption server, and when verified, the redemption center is instructed to dispense the awarded prize P).

In yet another embodiment of the invention, the system 100 includes one or more redemption centers 108 and the player plays one or more traditional non-casino games, such as skill or amusement games, at an amusement/skill game or prize play unit 110 (or via one of the "dual" gaming machines 22 described above). Such a prize play unit 110 may comprise a device which presents one or more traditionally skill or amusement type games. Such a unit 110 may be similar to the "dual" gaming machine 22 described above, except that the prize play unit 110 need not be configured to present wagering games and thus does not need to include features which are exclusively needed to present a wagering game.

Figure 8:
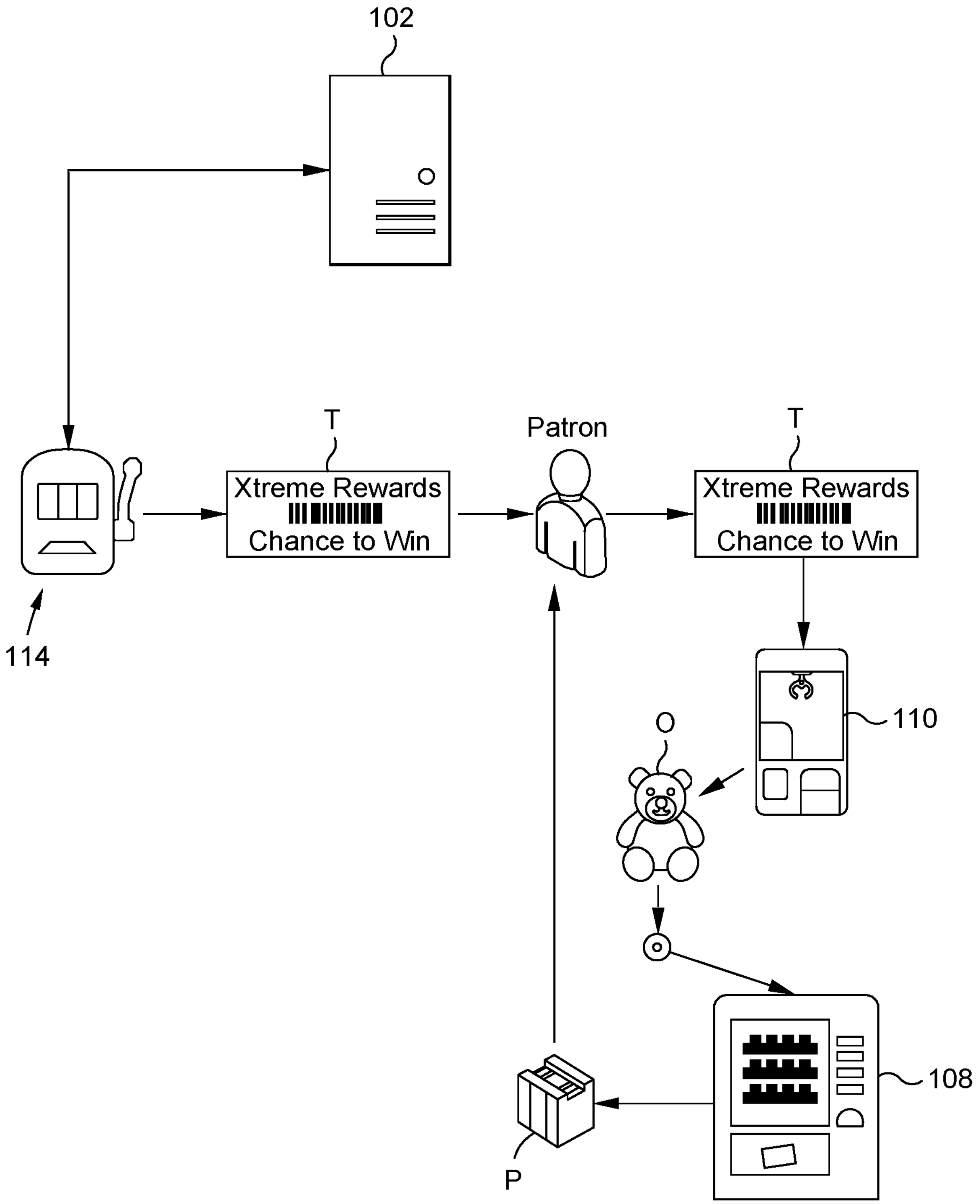
FIG. 8 illustrates another example prize award and redemption flow in accordance with an embodiment of the invention.

Referring to FIG. 8, one embodiment of the operation of the system 100 is as follows:

One or more rewards events are set up in the rewards system 100.

The player plays a wagering game via one or more of the EPIs 114.

The system collects play data and sends it to rewards server 102.

The rewards server 102 monitors play data until a threshold matching the event is met.

The rewards server 102 sends a message to the system awarding a prize.

The system 100 displays the prize award at the EPI.

Optionally, the player can accept or reject prize.

If the player accepts, they receive a printed ticket T from the EPI.

The player takes their ticket T to the prize play unit 110, such as to play a traditional skill or amusement game for an opportunity to win an additional prize.

If successful, the player may win or obtain an object O, such as an RFID object, an award ticket or other object.

The player takes their object O, to a redemption center 108 to redeem their prize, where the redemption center reads the object O (such as an RFID tag associated therewith, information printed or coded onto a ticket, etc.) and then dispenses the prize P that is indicated thereby. The redemption center 108 may be located in a different location than where the ticket was printed or where the skill or amusement type game was located.

Figure 9:
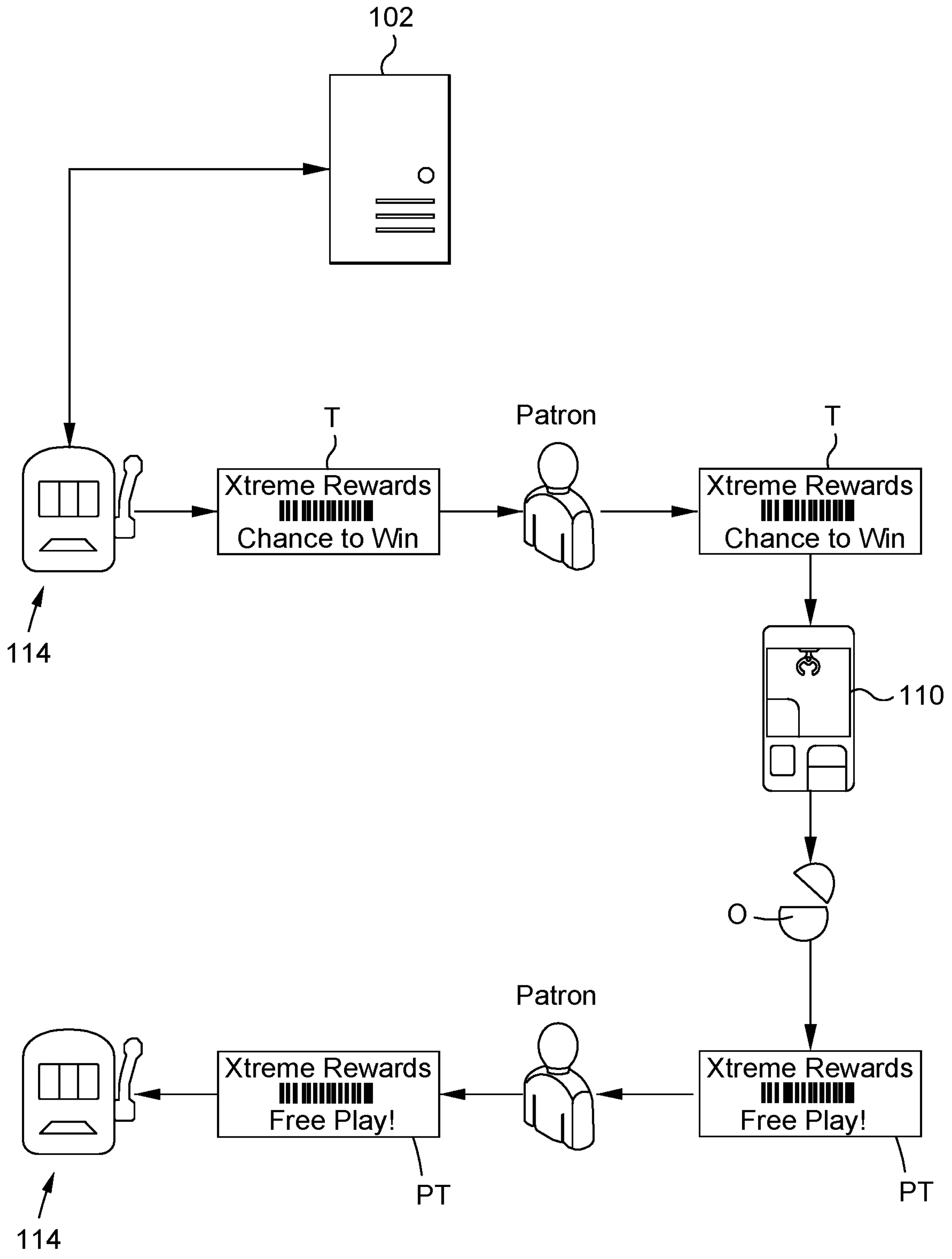
FIG. 9 illustrates yet another example prize award and redemption flow in accordance with an embodiment of the invention.

A variation of the above will be described with reference to FIG. 9.

In one embodiment, the prize which is awarded to the player via play of the skill/amusement "rewards" game is a prize ticket PT. The ticket might be directly dispensed to the player, or might be located inside another object O, such as an egg. In one embodiment, the object of the skill or amusement game might be for the player to attempt to grab or capture an egg, such as by pushing it off the edge of a platform, by grabbing it with a claw or crane or the like. If successful, the capture of the egg may either trigger the dispensing of a prize ticket PT or the egg might be awarded to the player and contain a prize ticket PT.

This prize ticket PT may entitle the player to play one or more wagering games or may represent one or more monetary value credits that the player can associate with a gaming machine for the purpose of placing a wager, such as one of the EPIs 114 (or a "dual" gaming machine 22 as described herein). Thus, the player may present the prize ticket PT to a wagering game and the wagering game machine may validate the ticket, such as via the rewards server, to associate credits to the gaming machine or present one or more wagering games to the player.

In one embodiment, a player might be awarded a single ticket which is redeemable for a prize. In other embodiments, a player might be awarded multiple tickets where the multiple tickets may be redeemed for a prize. As one example, a goal might be for the player to collect several pieces, such as via play of wagering games, to complete a set. Once the player has collected all pieces, he or she is presented with a new ticket that gives them a chance for a prize. That prize may be merchandise, may be a free play of a skill-based game which can then lead to additional prizes, may be a ticket for a free play, and so on.

One advantage to the present invention is a system that does not require a player's club card in order to earn prizes, but can award prizes "anonymously." In a scavenger hunt game, then, the system must be able to provide the player with a means by which their progress can be maintained. This is done through ticket consolidation at the Redemption Center.

As an example, a scavenger hunt rewards event might require players to collect six chess pieces: king, queen, knight, bishop, rook, and pawn. Assume that the player has obtained three of six pieces during a play session and that those pieces are the pawn, bishop, and rook. The player can hold onto those three tickets until they have all six or they can consolidate the tickets they have in hand. To consolidate the tickets, the player takes them to the redemption center and presents them to the reader, one at a time. The redemption center confirms on-screen that the player wants to consolidate the tickets. If the player chooses to consolidate, a new ticket is printed and presented to the player. The new ticket would then contain text that indicates the game pieces that make up the consolidated ticket. In this case the ticket would have printed on it something to the effect of "Scavenger Hunt: pawn, bishop, rook."

As one example, in this example the player might continue playing and earn the knight piece. He or she could return to the redemption center and insert the consolidated ticket, followed by the knight ticket. He or she would then get back a ticket on which was printed, "Scavenger Hunt: pawn, bishop, rook, knight." Once all pieces are obtained, the player could redeem the fully consolidated ticket for his or her final prize.

As indicated above, in one embodiment, rewards might be awarded directly at a "dual" gaming machine 22. However, in other embodiments, rewards might be awarded at one or more redemption centers or units 108.

One embodiment of the invention is an automated redemption center 108—e.g. an electro-mechanical device which is configured to accept tickets (such as by scanning or reading information associated with the ticket, such as using an optical or magnetic stripe reader, RFID reader, etc.), verify the tickets (such as by communication with the rewards server) and dispense awards, preferably without the need for a human attendant.

The redemption center 108 may comprise a housing having an interior area. At least a portion of the interior area may comprise a prize storage area. The prize storage area is preferably secure. A front of the prize storage area might be transparent, so as to allow the player to see the prizes therein. The redemption center 108 may comprise a prize dispensing mechanism which is configured to move a prize from the prize storage area to a prize retrieval area, such as a prize hopper.

The redemption center 108 may comprise a controller and a communication interface. The controller may be configured to receive information from the ticket reader, to communicate with the rewards server for validating the ticket and any prize associated therewith, and to control the prize dispensing mechanism. The redemption center might also be configured to track prize inventory, including prizes loaded into the prize storage area, the number of prizes dispensed and the like, such as for reporting the current level of prizes at the redemption center or to report a low supply of one or more prizes, such as to the rewards server or other entities, for as to ensure stocking of the prizes.

In one embodiment, the redemption center 108 might include a media printer, such as a ticket printer. When the prizes comprise services, discounts or the like, the redemption center 108 might be configured to issue vouchers or tickets (such as for a free buffet, a free movie or show, or even a voucher which is redeemable for goods or services at another location). In one embodiment, such vouchers may be configured to be read by a ticket reader of the EPIs in a similar manner to monetary value tickets (as disclosed in U.S. Pat. No. 6,048,269 to Burns).

As another aspect of the invention, casinos generally have player loyalty systems which are used to track player play and award loyalty awards (for example, via a player tracking system or server 116 as illustrated in FIG. 5). For example, a casino might track a player's wagering game play and determine that the player has wagered over $2500 in one month. The casino might award the player with a free jacket or the like which the player could obtain at a player loyalty booth at the casino. In accordance with the invention, the "dual" gaming machines 22, the amusement/skill type prize units 110, or the automated prize redemption centers or units 108 may be used as player loyalty award dispensing devices. For example, a casino might indicate an award to a player which the player can redeem at one of those devices. For example, in such a configuration the player tracking system may generate and issue a media, such as a ticket or the like, which represents a prize. The player may present the ticket to one of the devices in order to redeem the prize. In the case of the automated prize redemption unit 108, the unit 108 might validate the ticket with the player tracking system and then directly dispense the prize. In the case of one of the "dual" gaming machines 22 or the amusement/skill type prize units 110, the player might present the ticket and then play the amusement/skill game. As indicated herein, the player might have to "win" the play in order to receive the prize. In another embodiment, the player might be permitted to continue to play the device until the prize is won (such as by being successfully grasped by the claw as controlled by the player; wherein the prize is essentially guaranteed to the player). In some embodiments, such an award might require the player to play the wagering game in order to be entitled to play the amusement-type game.

In other embodiments, the player might be rewarded with one or more free plays of the amusement type game. For example, the casino might award the player 10 free plays of the amusement type game. The player might insert their player tracking card into the media reader 56 (see FIGS. 1A and 1B) and provide their PIN number. The gaming machine 22 would then confirm that the player has 10 free plays of the amusement type game associated with their account (such as by contacting the player tracking server 116), and award those plays to the player, wherein the player might win prizes associated with none, one or more of the plays.

In another embodiment of the invention, the gaming machines 22 may be used as promotional award dispensing devices as to players of other gaming machines. For example, different gaming machines 22 of the invention might be loaded with different prizes. A player of a gaming machine (whether such comprises a gaming machine with or without the amusement-type features described herein) might be awarded a ticket or the like which directs them to a different gaming machine 22 of the invention for play of the amusement-type game which is associated therewith. As one example, a player of a gaming machine which does not have an amusement-type game feature of the invention may be directed (such as via an issued ticket) to go to a gaming machine 22 of the present invention to redeem the ticket for a play of an amusement-type game (such a ticket might be awarded to a player via a promotional award system such as described herein, wherein the ticket may be coded and be read at the redeeming machine, validated (such as via the promotional server) and then trigger a play of the amusement type game). As another example, a first gaming machine 22 might have monetary value prizes and a second gaming machine 22 might be loaded with goods. A player of the first gaming machine 22 might be directed to go to the second gaming machine 22 in order to redeem or play a play of the amusement-type game associated therewith, in order to allow the player a chance to win a good (but not monetary value).

In one embodiment of the invention, a player may directly play an amusement or skill-type game at either a "dual" gaming machine 22 or at an amusement/skill prize device 110, for a prize. In another embodiment, a player might play the amusement/skill game remotely. For example, a player might play a standard EPI 114 (e.g. a gaming device which is configured to present a wagering game but not an amusement/skill prize game). The player might be awarded a reward, such as described. Instead of then travelling to an amusement/skill game which is in a different location (and, for example, providing the awarded ticket to the device to play the game), the player might remotely play the device, such as from the EPI 114 or a phone or other computing device. In such a configuration, the player might interface to the remote amusement/skill game device 110, wherein the game is locked for play by the player, and wherein an image of game play at the remote device 110 is presented to the player, such as via a display of the EPI 114 or their computing device. The player might use input devices of their computing device or EPI 114 to provide play inputs to the remote device 110, such as to control the movement of the claw/crane.

In one embodiment, a media is dispensed to the player and the player utilizes that media to either obtain a prize or play an amusement/skill game for a prize. In other embodiments, an indication of a prize (or the right to play for a prize) may be associated with a player account or the like, such as by being stored electronically. For example, a player might provide their player tracking card or player tracking identification information to an EPI 114, thus identifying the player. The player might be awarded a prize and be so notified at the EPI 114 by the rewards server 102, wherein information regarding the player and the award may be stored. The player might then travel to an amusement/skill prize device 110 and identify themselves, such as by using their player tracking card or player tracking information. The identification information may be used by the rewards server 102 to verify the player and the award, thus indicating to the amusement/skill prize device 110 to allow the player to play the device (e.g. without having to input a ticket).

In one embodiment, prizes might be awarded in other manners, such as electronically. As one example, a player might win a prize as a result of the play of the amusement-type event of the gaming machine 22. Instead of dispensing the prize or a ticket representative of the prize, the gaming machine 22 might send confirmation of the prize to the player, such as to their phone (via text, email, etc.). For example, a player might identify themselves with their player tracking card, which card is linked to an account which stores their phone number. A prize win indication might be transmitted to the player's phone, such as in the form of a barcode which the player can use to redeem the prize, such as at a prize redemption center or booth as described herein. In other embodiments, the prize itself might be electronic. For example, the player might win social media game credits, video game upgrades or the like. The player might be sent a validation code which the player can scan or input into the social media game website, video game, etc.

In one embodiment, certain wins, such as certain prize wins, may result in the gaming machine 22 locking up. Such a lock-up may be implemented by the controller of the gaming machine 22 upon detecting or determining an award of a prize of a certain size. This lock-up may be accompanied by an alert to the operator to confirm the award/prize to the player (such as to confirm that the award/prize was properly awarded, rather than as a result of tampering, malfunction or the like). In such an event, the player might be required to fill out and sign prize award paperwork, such as for governmental reporting (including tax) purposes. Once such a confirmation is processed by the operator, the operator may reset the machine for operation.

In one configuration of the invention, features of the invention may be used to entice players to travel from one location to another. For example, as a reward for a purchase at a convenience store or play of an EPI 114 at such a store or at a first location, the player might be awarded a ticket for play of the amusement-style event of the gaming machine 22 or for redemption of a prize at a prize redemption center 108. The gaming machine 22 or redemption center 108 may, however, be at a second location. As one example, a casino at which the gaming machine 22 or redemption center 108 is located might partner with other entities or locations to provide prize or play tickets to customer at those locations, thus enticing the customers to travel to the casino to play the amusement game for a chance at a prize or to redeem a prize.

In one embodiment, gaming machines 22 of the invention might be linked. Players of the amusement-type game might try and be the first to pick up a designated prize or the like, wherein the first to do so wins the prize.

In other embodiments, the gaming machines 22 might be used as part of a tournament event. As one example, players might be selected (such as based upon level of game play during a particular period, accrued player points or the like) or pay to enter a tournament. In the tournament, the players might play a set of linked gaming machines 22. During the tournament period, the player would attempt to achieve one or more criteria, such as having the highest number of awarded amusement-style event awards, winning game outcomes or the like. The winner of the tournament would then be allowed to play the amusement-style event on their gaming machine 22 for a bonus prize. For example, players might play base games and attempt to accrue the highest number of amusement-style event plays. The winner might be a player who accrued 17 plays. The winner would then be allowed to play the 17 amusement-style event plays on their gaming machine 22 and keep the prizes won as a result of the play of those events. In another embodiment, the winning player might play a specific gaming machine 22 or a specific amusement/skill prize device 110, such as one loaded with specific sets of prizes, such as larger prizes or at least one jackpot type prize opportunity.

While embodiments of the invention have been described with reference to certain technologies, other technologies might be utilized. For example, various embodiments of the invention have been described with reference to the use of RFID technology, including RFID tags. Other technology that now exists or may later be developed might be utilized. For example, instead of identifying an object (such as an egg) via RFID, other technologies such as optical readers (for 2D and 3D barcodes, for example) and other communication technologies such as Zigbee, WiFi, Bluetooth, and many others might be used (for example, prize eggs might be fitted with Bluetooth transmitters or the like).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A rewards system for awarding a promotional prize to a player of a wagering game, comprising:

a dual wagering game and amusement-type prize-play device configured to present one or more wagering games and one or more amusement-type games, comprising:

a housing defining a prize area for containing one or more prizes for winning as a result of the play of the dual wagering game and amusement-type prize-play device;

a captured prize detector;

a moveable prize play mechanism;

at least one display device supported by said housing;

a controller;

a memory;

at least one player input device, said at least one player input device comprising a device for receiving input from a player to control movable prize play mechanism; and machine-readable code stored in said memory and executable by said controller to cause said controller to:

present at least one wagering game to said player in response to a wager by said player, comprising presenting wagering game information on said at least one display device; and determine an outcome of said wagering game and award winnings for winning outcomes of said wagering game;

and a prize rewards server in communication with said dual wagering game and amusement-type prize-play device, said prize rewards server comprising a processor, a memory and machine-readable code stored in said memory and executable by said processor, said machine-readable code of said rewards server configured to cause said processor of said prize rewards server to:

receive, from an operator, an indication of at least one promotional prize triggering event, independent of an outcome of said wagering game;

compare activity information obtained from said dual wagering game and amusement-type prize-play device to determine if said at least one promotional prize triggering event has occurred;

when a promotional prize triggering event has occurred, determine that a predetermined prize should be awarded and transmit an instruction to said controller of said dual wagering game and amusement-type prize-play device to permit said player to play an amusement game at said dual wagering game and amusement-type prize-play device;

said machine-readable code of said dual wagering game and amusement-type prize-play device configured to cause said controller thereof to, in response to said instruction, allow said player to play said amusement-type game in an attempt to win a prize from said prize area thereof by receiving input to said at least one player input device to move said moveable prize play mechanism in an attempt to capture a prize from said prize area, and when said player captures a prize which is indicated by said captured prize detector to comprise said predetermined prize, cause said dual wagering game and amusement-type prize-play device to award said prize, and when said player captures a prize which is indicated by said captured prize detector to comprise a prize other than said predetermined prize, to allow said player another play of said amusement-type game until said player captures said predetermined prize.

2. The rewards system in accordance with claim 1, wherein said movable prize play mechanism comprises a crane.

3. The rewards system in accordance with claim 1, wherein said movable prize play mechanism comprises a claw.

4. The rewards system in accordance with claim 3, wherein said machine-readable code of said dual wagering game and amusement-type prize-play device is further configured to cause said controller to cause said claw to drop a prize grabbed thereby when said captured prize detector indicates that said prize does not comprise said predetermined prize.

5. The rewards system in accordance with claim 1, wherein said moveable prize play mechanism comprises a pusher-device.

6. The rewards system in accordance with claim 1, wherein said prizes in said prize area are tangible items.

7. The rewards system in accordance with claim 6, wherein said captured prize detector comprises an RFID reader and said one or more prizes comprise tangible items each having an associated RFID tag, said RFID tag identifying said prize.

8. The rewards system in accordance with claim 1, wherein said promotional prize triggering event criteria comprises one or more of: a) an amount lost by said player during game play at said gaming machine; b) an amount wagered by said player at said gaming machine; c) an amount of theoretical loss by said player at said gaming machine; d) an amount won by said player at said gaming machine; e) a number of games played by said player at said gaming machine; f) a number of games played by said player at said gaming machine without a winning outcome; and g) a duration of time spent actively playing on said gaming machine.

9. A method of awarding promotional prizes to players of wagering games, comprising the steps of:

receiving a wager from a player of a dual wagering game and amusement-type prize-play device;

presenting, via a controller of said device, at least one wagering game to said player in response to a wager, comprising presenting wagering game information on at least one display device of said dual wagering game and amusement-type prize-play device;

determining an outcome of said wagering game with reference to a paytable for said wagering game;

awarding winnings for a winning outcome of said wagering game as defined by said paytable;

comparing activity information associated with said player's play of said at least one wagering game at said dual wagering game and amusement-type prize-play device to determine if at least one promotional prize triggering event has occurred, said at least one promotional prize triggering event comprising an event other than a winning outcome as defined by said paytable of said wagering game;

when a promotional prize triggering event has occurred, determining that a predetermined prize should be awarded and allowing said player to play an amusement-type promotional prize game at said dual wagering game and amusement-type prize-play device in an attempt to win a prize from a prize area thereof by receiving input to at least one player input device to move a moveable prize play mechanism in an attempt to capture a prize from said prize area;

awarding a captured prize when said captured prize is determined to be said predetermined prize;

determining that said player did not win said amusement-type promotional prize game when said player captures a second prize as a result of the play of said amusement-type promotional prize game, said second prize being different than said predetermined prize; and transmitting an instruction to said controller to permit said player to play said amusement-type promotional prize game until said player captures said predetermined prize.

10. The method in accordance with claim 9, wherein said movable prize play mechanism comprises a claw and said captured prize comprises a prize captured by said claw from said prize area.

11. The method in accordance with claim 9, further comprising, when a promotional prize triggering event has occurred, receiving an instruction from a rewards server to said controller of said device, of an award of at least one play of said amusement-type promotional prize game.

12. The method in accordance with claim 9, wherein said at least one display which presents said wagering game information is located in said prize area.

13. The method in accordance with claim 9, further comprising means for identifying a captured prize, wherein said controller is configured to cause said captured prize to be awarded by dispensing it from the dual wagering game and amusement-type prize-play device when said captured prize is identified to comprise said predetermined prize.

14. The method in accordance with claim 9, wherein said predetermined prize is determined by a remote rewards server.

15. The method in accordance with claim 1, wherein said movable prize play mechanism comprises a token launcher.

16. The method in accordance with claim 9, comprising utilizing a detector comprising a mass sensor or an RFID reader to determine whether said captured prize is said predetermined prize or said second prize.

17. The method in accordance with claim 9, wherein said second prize is captured by a claw device from a prize play area of said dual wagering game and amusement-type prize-play device and further comprising returning said second prize to said prize area.

* * * * *